United States Patent
Naskar et al.

(10) Patent No.: US 11,572,446 B2
(45) Date of Patent: Feb. 7, 2023

(54) LIGNIN DISPERSION COMPOSITION AND ITS USE IN STABILIZING EMULSIONS

(71) Applicant: UT-Battelle, LLC, Oak Ridge, TN (US)

(72) Inventors: Amit K. Naskar, Knoxville, TN (US); Mengmeng Cui, Kingsport, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 69 days.

(21) Appl. No.: 17/011,477

(22) Filed: Sep. 3, 2020

(65) Prior Publication Data

US 2021/0070949 A1 Mar. 11, 2021

Related U.S. Application Data

(60) Provisional application No. 62/896,037, filed on Sep. 5, 2019.

(51) Int. Cl.
| | | |
|---|---|---|
| *C08J 3/03* | (2006.01) | |
| *C07G 1/00* | (2011.01) | |
| *C08J 3/24* | (2006.01) | |
| *C08L 97/00* | (2006.01) | |
| *C08H 7/00* | (2011.01) | |

(52) U.S. Cl.
CPC ............ *C08J 3/03* (2013.01); *C07G 1/00* (2013.01); *C08H 6/00* (2013.01); *C08J 3/24* (2013.01); *C08L 97/005* (2013.01)

(58) Field of Classification Search
CPC ............ C07G 1/00; C08L 97/005; C08H 6/00
See application file for complete search history.

(56) References Cited

U.S. PATENT DOCUMENTS

| | | | | |
|---|---|---|---|---|
| 4,957,557 A | * | 9/1990 | Dimitri | C08H 6/00 |
| | | | | 106/501.1 |
| 2014/0339455 A1 | * | 11/2014 | Miettinen | C08L 97/005 |
| | | | | 422/261 |
| 2015/0166836 A1 | * | 6/2015 | Liu | C09D 197/005 |
| | | | | 524/76 |
| 2017/0101430 A1 | * | 4/2017 | Enqvist | C07G 1/00 |
| 2017/0247255 A1 | * | 8/2017 | Wittmann | C08L 97/005 |
| 2017/0247835 A1 | * | 8/2017 | Leschinsky | D21C 11/0007 |
| 2019/0225809 A1 | | 7/2019 | Naskar et al. | |
| 2019/0256709 A1 | | 8/2019 | Naskar et al. | |
| 2020/0255466 A1 | * | 8/2020 | Lintinen | B01J 13/0021 |
| 2021/0079123 A1 | * | 3/2021 | Benjelloun Mlayah | C08L 97/005 |
| 2021/0261742 A1 | * | 8/2021 | Harasek | C08L 97/005 |
| 2022/0010077 A1 | * | 1/2022 | Österberg | C08L 97/005 |
| 2022/0096533 A1 | * | 3/2022 | Grossman | A61K 31/7072 |
| 2022/0106508 A1 | * | 4/2022 | Johansson | C03C 25/328 |

FOREIGN PATENT DOCUMENTS

| | | |
|---|---|---|
| WO | 2018/219954 A1 | 12/2018 |
| WO | 2019/081819 A1 | 5/2019 |

OTHER PUBLICATIONS

Lintenen et al. (Green Chem. 2018, 20, 843-850) (Year: 2018).*
Lievonen et al. (Green Chemistry, 2016, 18, 1416-1422) (Year: 2016).*
International Search Report and Written Opinion dated Feb. 19, 2021 issued in PCT/US 20/49171, 11 pages.
Cui, M., et al., "A Cast Net Thrown onto an Interface: Wrapping 3D Objects with an Interfacially Jammed Amphiphilic Sheet", Advanced Materials Interfaces, 2020, pp. 1-8, 1901751.
Feng, T., et al., Interfacial rheology of polymer/carbon nanotube films co-assembled at the oil/water interface, The Royal Society of Chemistry 2016, Soft Matter, Accepted Sep. 26, 2016, pp. 8701-8709, 12.
Ku, K.H., et al., "Particles with Tunable Porosity and Morphology by Controlling Interfacial Instability in Block Copolymer Emulsions", ACS Nano 2016, Accepted May 3, 2016, Published May 3, 2016, pp. 52430-5251, 10.
Kumar, D., et al., "Wrapping with a splash: High-speed encapsulation with ultrathin sheets", Science (2018), Feb. 16, 2018, pp. 775-778, 359.
Paulsen, J.D., et al., "Optimal wrapping of liquid droplets with ultrathin sheets", Nature Materials, Dec. 2015, pp. 1206-1210, vol. 14.
Pickering, S.U., "Emulsions", Journal of the Chemical Society, Jan. 1, 1907, pp. 2011-2021, 91.
Py, C., et al., "Capillary Origami: Spontaneous Wrapping of a Droplet with an Elastic Sheet", The American Physical Society, Physical Review Letters (2007), week ending Apr. 13, 2007, pp. 156103-1-156103-4, PRL 98.

(Continued)

*Primary Examiner* — Liam J Heincer
(74) *Attorney, Agent, or Firm* — Scully, Scott, Murphy & Presser, P.C.

(57) ABSTRACT

A lignin dispersion composition comprising spherical lignin particles dispersed in an aqueous medium, wherein the spherical lignin particles have a size exclusively within a range of 100 nm to 5 microns. Also described herein is a method of producing the lignin dispersion, by: (i) dissolving lignin in an organic solvent substantially devoid of water yet miscible with water to result in a solution of the lignin in the organic solvent; and (ii) producing the lignin dispersion by dialyzing the solution of the lignin with water until substantially all of the organic solvent is replaced with water with simultaneous formation of spherical lignin particles dispersed in the water. Also described herein is a method for stabilizing an emulsion by intimately mixing the emulsion with the lignin dispersion. Also described herein is a hierarchical assembly of porous microparticles produced by mixing the lignin dispersion with an emulsion and an amphiphilic block copolymer.

18 Claims, 11 Drawing Sheets

(56) References Cited

OTHER PUBLICATIONS

Roman, B., et al., "Elasto-capillarity: deforming an elastic structure with a liquid droplet", Journal of Physics: Condensed Matter, in final form Sep. 28, 2010, Published Nov. 16, 2010, pp. 1-16, 22 (2010) 493101.

Rumyantsev, A.M., et al., "A polymer microgel at a liquid-liquid interface: theory vs. computer simulations", The Royal Society of Chemistry 2016, Soft Matter, 2016, Accepted Jul. 18, 2016, pp. 6799-6811, 12.

\* cited by examiner (1C)

(1D)

(3A)

(3B)

LIGNIN DISPERSION COMPOSITION AND ITS USE IN STABILIZING EMULSIONS

CROSS-REFERENCE TO RELATED APPLICATIONS

The present application claims benefit of U.S. Provisional Application No. 62/896,037 filed Sep. 5, 2019, all of the contents of which are incorporated herein by reference.

STATEMENT REGARDING FEDERALLY SPONSORED RESEARCH

This invention was made with government support under Prime Contract No. DE-AC05-00OR22725 awarded by the U.S. Department of Energy. The government has certain rights in the invention.

FIELD OF THE INVENTION

The present invention generally relates to lignin compositions, and more particularly, lignin particles and dispersions thereof in a liquid. The present invention further relates to use of lignin compositions and dispersions for stabilizing an emulsion.

BACKGROUND OF THE INVENTION

Wrapping of a three-dimensional object in a two-dimensional sheet is commonly seen in nature and widely used in everyday life and industry. Protection of the encapsulated materials from the surroundings to minimize material loss or friction is the initial and the most familiar purpose of wrapping. In some cases, wrapping may be used to endow objects with a desired property, such as hydrophobicity, optical properties, or conductive properties. The range of wrapped content has expanded to liquids, with the encapsulant being a solid elastic film or solid-like jammed film of functional particles. Such films may be rigid enough to stabilize non-equilibrium morphologies of the wrapped liquid, thus breaking the limit of equilibrium morphologies and further creating new shapes of wrapped, encapsulated fluids with unique functionalities.

For traditional liquid-phase technologies, a liquid-like layer of surfactant or particles is typically used for wrapping and stabilizing liquid droplets. Recent studies show that sufficiently thin elastic sheets offer a novel path to spontaneously wrap liquid droplets using capillary forces, where the elastic energy of curving sheets is balanced by the reduction of interfacial energy (e.g., J. D. Paulsen et al., *Nat. Mater.*, 14, 1206, 2015 and D. Kumar et al., Science, 359, 775, 2018). Although negligible at macroscopic scales, capillary forces become dominant and are able to bend the elastic sheets when the bending rigidity of elastic sheets is vanishingly small (e.g., C. Py et al., *Phys. Rev. Lett.*, 98, 156103, 2007 and B. Roman et al., *J. Phys. Condens. Matter*, 22, 493101, 2010). The robust elastic sheets allow the liquid drops to be trapped in non-equilibrium 3D shapes via a process that is usually referred to as capillary origami (e.g., C. Py et al., Ibid.; D. Kumar et al., Ibid.). However, the interfacial activities of these elastic sheets are generally of insufficient strength to manipulate the interfacial tension. Also, unlike a liquid layer of surfactants, a conventional elastic film cannot spontaneously repair itself after mechanical damage. A large-scale surfactant sheet with a significant interfacial activity and that could sustain repeated change or damage through reassembly would be a significant advancement in the development of stable emulsions.

SUMMARY OF THE INVENTION

In a first aspect, the present disclosure is directed to a unique lignin substance obtained, as further discussed below, by a special method in which lignin dissolved in an organic solvent is dialyzed with water to form an aqueous solution of dispersed lignin particles (i.e., an aqueous lignin dispersion). The lignin dispersion is unique in that it possesses exceptional emulsion stabilizing properties and can also be used to form solid films containing a hierarchical assembly of porous microparticles. More specifically, the lignin dispersion contains spherical lignin particles dispersed in an aqueous medium, wherein the spherical lignin particles have a size exclusively within a range of 100 nm to 5 microns. In some embodiments, the spherical lignin particles have a size exclusively within a range of 200 nm to 2 microns. In further embodiments, the lignin particles are substantially uniform in size as characterized by a median particle size within a range of 400 nm to 4.9 microns or 400 nm to 1.9 microns and a maximum deviation from the median particle size of ±100 nm. In some embodiments, the composition (dispersion) does not contain a surfactant. In some embodiments, the composition contains only an aqueous solvent and the lignin particles.

In a second aspect, the present disclosure is directed to a method of making the lignin dispersion described above from a lignin source. The lignin source can be any lignin-containing material, such as Kraft lignin, sulfite lignin (i.e., lignosulfonate), or a sulfur-free lignin, and the lignin may be derived from any lignocellulosic source, such as hardwood, softwood, grasses, shells, husks, or hulls. The lignin may also be from a biorefinery waste stream. The method generally involves: (i) dissolving lignin in an organic solvent (e.g., a ketone, alcohol, or nitrile) substantially devoid of water yet miscible with water to result in a solution of the lignin in the organic solvent; and (ii) producing the lignin dispersion by dialyzing the solution of the lignin with water until substantially all of the organic solvent is replaced with water with simultaneous formation of spherical lignin particles dispersed in the water, wherein the spherical lignin particles have a size exclusively within a range of 100 nm to 5 microns or 200 nm to 2 microns, and may have any of the uniformity characteristics described above. In some embodiments, the method further includes: (iii) centrifuging the lignin dispersion produced in step (ii) to separate flocculated matter from the lignin dispersion, and (iv) retrieving the supernatant in which the lignin dispersion is present.

In a third aspect, the present disclosure is directed to a method for stabilizing an emulsion containing at least two immiscible liquids. In the method, the emulsion is intimately mixed with the lignin dispersion composition described above. The intimate mixing results in the unraveling and self-assembly of the lignin particles at interfaces of the immiscible liquids. In some embodiments, the spherical lignin particles unravel to form a sheet of 5-20 nm thickness at the liquid-liquid interface of the at least two immiscible liquids. More specifically, the emulsion is stabilized by in situ formation of large-scale lignin surfactant sheets with strong interfacial activities. The lignin surfactant sheets operate by interfacial jamming of poorly soluble amphiphilic lignin macromolecules in particulate form at an oil/water interface. The amphiphilic nature of the surfactant sheet results in wrapping of either water or oil droplets, while its rigidity allows it to hold the liquid phases in various non-equilibrium morphologies. The surfactant sheet is physically networked by reversible hydrogen bonding and π-π interactions, which endow it with transforming and self-healing ability. The strong interfacial activity of the surfactant sheet results in an interfacial instability, which drives evolution of interfacial morphology and novel wrapped microstructures.

In a fourth aspect, the present disclosure is directed to a method for producing a hierarchical assembly of porous microparticles. The method includes the following steps: (i) intimately mixing an emulsion containing at least two immiscible liquids with an amphiphilic diblock copolymer and a lignin dispersion composition comprising spherical lignin particles having a size exclusively within a range of 100 nm to 5 microns dispersed in an aqueous medium, to result in formation of a lignin sheet of 5-20 nm thickness at liquid-liquid interfaces between the at least two immiscible liquids, and forming a double emulsion containing the at least two immiscible liquids; (ii) spreading the emulsion containing the hierarchical assembly of porous microparticles onto a surface to produce a film of the double emulsion; and (iii) evaporating the immiscible liquids from the film to produce a solid film of the hierarchical assembly of porous microparticles. In particular embodiments, the amphiphilic diblock copolymer contains at least one hydrophilic polyalkylene oxide block and at least one lipophilic polyvinylhydrocarbon block.

BRIEF DESCRIPTION OF THE FIGURES

FIG. 1A is a schematic of lignin particle preparation via solvent exchange. The lignin polymers bearing multifunctional groups around an aromatic backbone gradually reduce in solubility and form a homogeneous suspension when the water content slowly increases in the organic solvent. FIG. 1B is a SEM image of uniform lignin particles with ca. 500 nm diameter. FIG. 1C is an optical image of a toluene-in-water emulsion stabilized by lignin particles. FIG. 1D is a plot of interfacial tension (IFT) vs. time showing the dependence of the dynamic interfacial tension of water/toluene on the concentration of lignin particles. The strong interfacial activity of particles arises from the hydrophobic backbone and the hydrophilic functional groups in the lignin chemical structure.

FIG. 2A is a schematic illustration of the formation of the surfactant sheet: amphiphilic lignin particles first self-assemble at the interface (left panel); upon contact with the oil phase, particles deformed and unfolded at the interface (right panel) to maximize the coverage and to decrease the unfavorable interactions between immiscible liquids. FIG. 2B is an optical microscopy image showing buckling of a partially dried emulsion droplet, which evidences a solid-like interface. FIG. 2C is a SEM image showing a thin film with a few wrinkles, which is further evidence of a solid-like interface. The wrinkles are a result of the collapse of an emulsion droplet after solvent evaporation. FIG. 2D shows the preparation of a large-scale surfactant sheet by floating a thin surfactant film on a silicon wafer at a planar interface. Following the folding pattern in the inset, trilayer wrinkles (encircled in black boxes) appear on the thin film during the floating process, accompanied by free lignin particles (circled in white) from the aqueous phase. FIG. 2E is an AFM image of a thin film with a trilayer wrinkle, prepared as shown in FIG. 2D. The thickness of the thin film is calculated by dividing the measured height of wrinkle by two.

FIG. 3A is a plot of IFT (mN/m) vs. time (t in seconds), which shows evolution of the toluene/water interfacial tension γ(t) measured by the pendant drop method after sudden increase of lignin particle packing density, which resulted from the droplet volume decreases. FIG. 3B is a plot of IFT vs. packing density, which shows the approximate linear dependence of interfacial tension on the area strain, $A_0/A$. Both the equilibrium interfacial tension (y-axis) and surface area (A) are obtained after retraction, while $A_0$ is when wrinkles begin to form. FIG. 3C are droplet retraction-relaxation photographs. The droplet recovery after retraction in stage II is dependent on the viscoelastic property of surfactant sheet.

FIG. 4 (bottom row) shows the formation of the cylindrical water droplet inside the needle and the formation of the contained toluene droplet by shear failure of the surfactant sheet.

DETAILED DESCRIPTION OF THE INVENTION

Figures 1A, 1B:
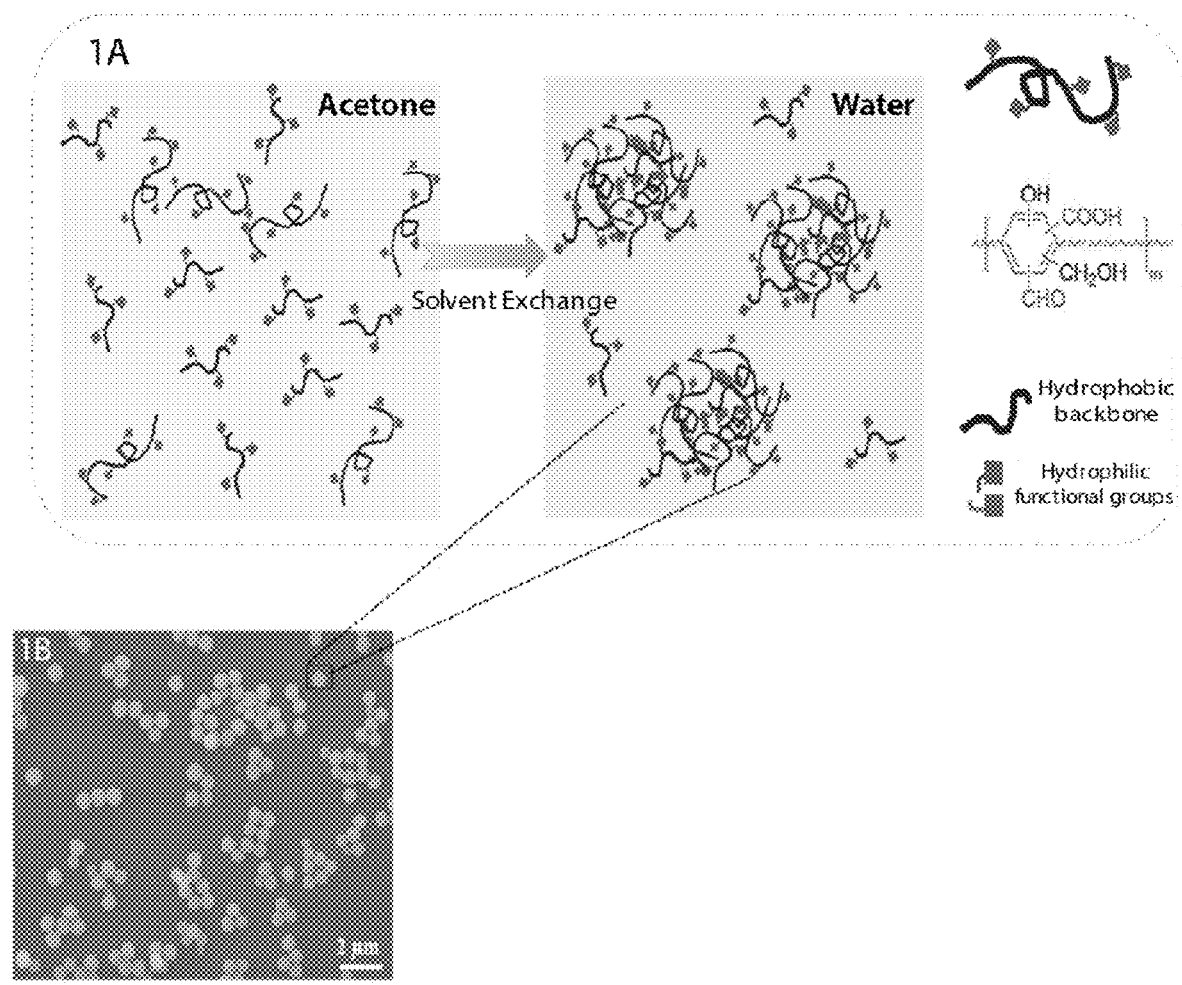
FIGS. 1A-1D. Preparation and interfacial activity of "soft" lignin particle surfactants.

In a first aspect, the invention is directed to a lignin dispersion composition containing spherical lignin particles (i.e., "lignin particles") dispersed in an aqueous medium. The term "spherical," as used herein, may, in some embodiments, refer to precisely spherical particles, but in other embodiments may refer to approximately spherical particles or particles having a general spherical shape with some irregularities, such as globular particles. The term "aqueous medium", as used herein, may, in some embodiments, refer to 100% water, but in other embodiments may refer to a medium containing predominantly water, typically at least 90, 95, 97, 98, or 99 vol % water, wherein the remainder of the medium may be a water-miscible organic solvent, such as a ketone solvent (e.g., acetone), alcohol solvent (e.g., methanol, ethanol, or isopropanol), or nitrile solvent (e.g., acetonitrile). In some embodiments, a water-miscible organic solvent is present in the aqueous medium in an amount of up to or less than 10, 5, 4, 3, 2, or 1 vol %.

The lignin particles have a size exclusively within a range of 100 nm to 5 microns. The term "exclusively" indicates that particles having a size of less than 100 nm or greater than 5 microns are substantially absent, e.g., such particles outside the indicated range are present in an amount of no more than or less than 5%, 2%, 1%, 0.5%, 0.2%, or 0.1% of total particles, or such particles are not present (i.e., no particles are present outside the indicated range). The foregoing percentages may be by weight (wt %), volume (vol %), or number of particles. In different embodiments, the lignin particles have a size of about or precisely, for example, 100 nm, 150 nm, 200 nm, 250 nm, 300 nm, 350 nm, 400 nm, 450 nm, 500 nm, 600 nm, 700 nm, 800 nm, 900 nm, 1 micron, 1.5 microns, 2 microns, 2.5 microns, 3 microns, 3.5 microns, 4 microns, 4.5 microns, or 5 microns, or a particle size within a sub-range bounded by any two of the foregoing values, e.g., 100 nm to 4 microns, 100 nm to 3 microns, 100 nm to 2 microns, 100 nm to 1 micron, 200 nm to 4 microns, 200 nm to 3 microns, 200 nm to 2 microns, 200 nm to 1 micron, 300 nm to 4 microns, 300 nm to 3 microns, 300 nm to 2 microns, 300 nm to 1 micron, 400 nm to 4 microns, 400 nm to 3 microns, 400 nm to 2 microns, 400 nm to 1 micron, 500 nm to 4 microns, 500 nm to 3 microns, 500 nm to 2 microns, or 500 nm to 1 micron. In some embodiments, the lignin particles have a size exclusively within a sub-range of 100 nm to 5 microns, e.g., within any of the sub-ranges exemplified above (e.g., exclusively within the sub-range of 200 nm to 2 microns or any other sub-range exemplified above). In other embodiments, the lignin particles have a size predominantly but not exclusively within a sub-range of 100 nm to 5 microns, e.g., within any of the sub-ranges exemplified above, wherein the term "predominantly" typically indicates at least 75%, 80%, 85%, 90%, or 95% of the lignin particles being within a stated sub-range and remainder of lignin particles outside the sub-range, provided that the remainder of lignin particles have a size exclusively within the broadest range of 100 nm to 5 microns.

In some embodiments, the lignin particles are substantially uniform in size. The size uniformity can be expressed by a level of deviation from a median particle size. The median particle size can be selected from any of the exemplary particle sizes provided above or from within any of the particle size ranges provided above. For example, in some embodiments, the lignin particles have a size characterized by a median particle size within a range of 200 nm to 4.9 microns, or within a range of 200 nm to 3.9 microns, or within a range of 200 nm to 2.9 microns, or within a range of 200 nm to 1.9 microns, or within a range of 400 nm to 4.9 microns, or within a range of 400 nm to 3.9 microns, or within a range of 400 nm to 2.9 microns, or within a range of 400 nm to 1.9 microns, and a maximum deviation from the median particle size of ±100 nm, ±50 nm, ±20 nm, ±10 nm, ±5 nm, ±2 nm, or ±1 nm. In a more specific example, the lignin particles may have a median particle size of 200 nm with a maximum deviation of ±50 nm or ±20 nm, which corresponds to particles having a size distribution within a range of 150-250 nm or 180-220 nm, respectively; or, as another example, the lignin particles may have a median particle size of 500 nm with a maximum deviation of ±50 nm or ±20 nm, which corresponds to particles having a size distribution within a range of 450-550 nm or 480-520 nm, respectively.

The lignin can be any of the wide variety of lignin compositions found in nature in lignocellulosic biomass and as known in the art. As known in the art, the lignin compositions found in nature are generally not uniform. Lignin is a random copolymer that shows significant compositional variation between plant species. Many other conditions, such as environmental conditions, age, and method of processing, influence the lignin composition. Lignins are very rich aromatic compounds containing many hydroxyl (also possible carboxylic) functional groups attached differently as both aliphatic and phenolic groups. Additionally, some lignins possess highly branched structures. These characteristics of lignins determine their corresponding physical properties. The molar mass or molecular weight ($M_w$) of the lignin is generally broadly distributed, e.g., from approximately 1000 Dalton (D) to over 10,000 D. In typical embodiments, the lignin may have a number-average or weight-average molecular weight (i.e., $M_n$ or $M_w$, respectively) of about, up to, or less than, for example, 300, 500, 1,000, 3,000, 5,000, 8,000, 10,000, 50,000, 100,000, 500,000 or 1,000,000 g/mol, or a weight within a range bounded by any two of the foregoing values, such as 500-10,000 g/mol or 500-5,000 g/mol [G. Fredheim, et al., *J. Chromatogr. A,* 2002, 942, 191.; and A. Tolbert, et al., *Biofuels, Bioproducts & Biorefining* 8(6) 836-856 (2014)] wherein the term "about" generally indicates no more than ±10%, ±5%, or ±1% from an indicated value.

The lignin generally contains phenyl rings interconnected by the typical linking groups known to be in lignin, e.g., independently selected from one or more of ether (—O—) and alkylene linkages (e.g., —$CH_2$—, —$CH_2CH_2$—, —$CH_2CH_2CH_2$—, or —$CH_2CH(CH_3)$—) and wherein hydroxy and/or methoxy groups are attached to the phenyl rings. The alkylene linkages can be linear or branched, but typically, at least a portion of the alkylene linkages are branched. Typically, the phenyl rings are interconnected by linkages containing both ether and alkylene portions, e.g., —OCH(R)—, —OCH(R)CH(R)—, OCH(R)CH(R)CH(R)—, —OCH($CH_2$OH)—, or —OCH(OH)CH($CH_2$OH)—, where R can be, for example, H, OH, $CH_2$OH, or —O—. Thus, at least a portion of the linkages connecting phenyl rings are also typically substituted with hydroxy groups. The lignin structure typically includes ether (—O—) linkages and C—C covalent linkages. Some of these C—C covalent linkages can be alkylene linkages as mentioned earlier and wherein hydroxy and/or methoxy groups are attached to the phenyl rings.

In some embodiments, the lignin is significantly deploymerized when isolated from its native biomass source and has a molar mass of less than 1000 D. Their natural branches and low $M_w$ generally result in very brittle characteristics. The aromatic structures and rich functional groups of lignins also lead to varied rigid and thermal properties. Lignins are amorphous polymers, which results in very broad glass transition temperatures ($T_g$), from ca. 80° C. to over 200° C. The glass transition temperatures are critical temperatures at which the lignin macromolecular segments become mobile. Some lignins exhibit a very good flow property (low molten viscosity), whereas others display several orders of magnitude higher viscosity.

Lignins differ mainly in the ratio of three alcohol monomer units, i.e., p-coumaryl alcohol, guaiacyl alcohol, and sinapyl alcohol. The polymerization of p-coumaryl alcohol, coniferyl alcohol, and sinapyl alcohol forms the p-hydroxyphenyl (H), guaiacyl (G) and syringyl (S) components of the lignin polymer, respectively. The lignin can have any of a wide variety of relative weight percents (wt %) of H, G, and S components or their derivatives. As observed in some seeds, lignin may also consist of caffeyl alcohol units, e.g., Chen et al., *Proc. Natl. Acad. Sci. U.S.A,* 109(5), 1772-1777 (2012). For example, the precursor lignin may contain, independently for each component, at least, up to, or less than 1 wt %, 2 wt %, 5 wt %, 10 wt %, 20 wt %, 30 wt %, 40 wt %, 50 wt %, 60 wt %, 70 wt %, 80 wt %, or 90 wt %, or within a range thereof, of any of the caffeyl alcohol, H, G, and S components. Typically, the sum of the wt % of each alcohol component is 100%, or at least 98% if other minor components are considered. Different wood and plant sources (e.g., hardwood (HW), such as oak, maple, poplar, and the like; softwood (SW), such as pine, spruce, and the like; or grass or perennial plant-derived lignins, such as switch grass, corn, bamboo, perennial grass, orchard grass, alfalfa, wheat, miscanthus, bamboo, and bagasse) often widely differ in their lignin compositions, and are all considered herein as sources of lignin. In some embodiments, depending on the desired characteristics of the emulsion or hierarchical assembly, any one or more types of lignin, as described above, may be excluded from the composition.

Besides the natural variation of lignins, there can be further compositional variation based on the manner in which the source lignin has been processed. For example, the source lignin can be a Kraft lignin, sulfite lignin (i.e., lignosulfonate), or a sulfur-free lignin. As known in the art, a Kraft lignin refers to lignin that results from the Kraft process. In the Kraft process, a combination of sodium hydroxide and sodium sulfide (known as "white liquor") is reacted with lignin present in biomass to form a dark-colored lignin bearing thiol groups. Kraft lignins are generally water- and solvent-insoluble materials with a high concentration of phenolic groups. They can typically be made soluble in aqueous alkaline solution. As also known in the art, sulfite lignin refers to lignin that results from the sulfite process. In the sulfite process, sulfite or bisulfite (depending on pH), along with a counterion, is reacted with lignin to form a lignin bearing sulfonate ($SO_3H$) groups. The sulfonate groups impart a substantial degree of water-solubility to the sulfite lignin.

There are several types of sulfur-free lignins known in the art, including lignin obtained from biomass conversion technologies (such as those used in ethanol production), solvent pulping (i.e., the "organosolv" process), soda pulping (i.e., "soda lignin"), and supercritical water fractionation or oxidation (i.e., "supercritical water fractionated lignin"). In particular, organosolv lignins are obtained by solvent extraction from a lignocellulosic source, such as chipped wood, followed by precipitation. The solvent system in organosolv delignification of biomass often include organic alcohols, such as methanol, ethanol, propanol, butanol, and isobutyl alcohol; aromatic alcohols, such as phenol and benzyl alcohol; glycols, such as ethylene glycol, triethylene glycol, propylene glycol, butylene glycol and other higher glycols; ketones, such as acetone, methyl ethyl ketone and methyl isobutyl ketone; organic acids, such as formic acid, acetic acid and propionic acid, amines, aldehydes, esters, organic nitrile compounds, diethyl ether, dioxane, glycerol, or mixture of these solvents. Typically, some degree of dilute acid pretreatment of biomass helps the delignification process. Due to the significantly milder conditions employed in producing organosolv lignins (i.e., in contrast to Kraft and sulfite processes), organosolv lignins are generally more pure, less degraded, and generally possess a narrower molecular weight distribution than Kraft and sulfite lignins. These lignins can also be thermally devolatilized to produce a variant with less aliphatic hydroxyl groups, and molecularly restructured forms with an elevated softening point. Any one or more of the foregoing types of lignins may be used (or excluded) as a component in the compositions and methods described herein.

The lignin may also be an engineered form of lignin having a specific or optimized ratio of H, G, and S components. Lignin can be engineered by, for example, transgenic and recombinant DNA methods known in the art that cause a variation in the chemical structure in lignin and overall lignin content in biomass (e.g., F. Chen, et al., *Nature Biotechnology*, 25(7), pp. 759-761 (2007) and A. M. Anterola, et al., *Phytochemistry*, 61, pp. 221-294 (2002)). The engineering of lignin is particularly directed to altering the ratio of G and S components of lignin (D. Guo, et al., The Plant Cell, 13, pp. 73-88, (January 2001). In particular, wood pulping kinetic studies show that an increase in S/G ratio significantly enhances the rate of lignin removal (L. Li, et al., *Proceedings of The National Academy of Sciences of The United States of America*, 100 (8), pp. 4939-4944 (2003)). The S units become covalently connected with two lignol monomers; on the other hand, G units can connect to three other units. Thus, an increased G content (decreasing S/G ratio) generally produces a highly branched lignin structure with more C—C bonding. In contrast, increased S content generally results in more (β-aryl ether ((β-O-4) linkages, which easily cleave (as compared to C—C bond) during chemical delignification, e.g., as in the Kraft pulping process. It has been shown that decreasing lignin content and altering the S/G ratio improve bioconvertability and delignification. Thus, less harsh and damaging conditions can be used for delignification (i.e., as compared to current practice using strong acid or base), which would provide a more improved lignin better suited for higher value applications.

Lab-scale biomass fermentations that leave a high lignin content residue have been investigated (S. D. Brown, et al., *Applied Biochemistry and Biotechnology*, 137, pp. 663-674 (2007)). These residues will contain lignin with varied molecular structure depending on the biomass source (e.g., wood species, grass, and straw). Production of value-added products from these high quality lignins would greatly improve the overall operating costs of a biorefinery. Various chemical routes have been proposed to obtain value-added products from lignin (J. E. Holladay, et al., Top Value-Added Chemicals from Biomass: Volume II—Results of Screening for Potential Candidates from Biorefinery Lignin, DOE Report, PNNL-16983 (October 2007)).

The lignin may, in some embodiments, be a crosslinked lignin that is melt-processable or amenable to melt-processing. The term "crosslinked" can mean, for example, that the lignin contains methylene (i.e., —$CH_2$—) and/or ethylene (i.e., —$CH_2CH_2$—) linkages (i.e., linking groups) between phenyl ring carbon atoms in the lignin structure. In some embodiments, a mild polycondensation condition can be used, such as by formaldehyde crosslinking of phenols or self-condensation by reaction between carboxylic acid and aliphatic hydroxy groups in the presence of appropriate catalysts to yield branched segments from these functionally enriched oligomers. By being "melt-processable" is meant that the crosslinked lignin can be softened, sheared, and melted or converted to a molten, highly viscous, or rubbery state starting at a particular glass transition temperature. The melted or highly viscous lignin can then be more easily processed, such as by mixing, molding, applying on a surface, or dissolving in a solvent. In some embodiments, the lignin is not crosslinked.

In some embodiments, the lignin exhibits a suitable steady shear viscosity to render it as a malleable film-forming material at the processing temperature and shear rate employed. Typically, at a low-shear melt processing condition (e.g., at 1-100 $s^{-1}$ shear rate regime), the steady shear viscosity of the lignin component is at least or above 100 Pa·s, 500 Pa·s, 1000 Pa·s, 3000 Pa·s, or 5000 Pa·s, or within a range therein. In some embodiments, the lignin forms a highly viscous melt (on the order of 10,000 Pa·s complex viscosity or higher) at a 100 $s^{-1}$ shear rate. In some embodiments, the lignin may be oxidized (e.g., by exposure to a chemical oxidizing agent), while in other embodiments, the lignin is not oxidized. In some embodiments, the lignin is chemically unmodified in the dispersion relative to its natural extracted or isolated form. In some embodiments, the lignin is chemically modified by acetylation, oxypropylation, hydroxymethylation, epoxidation, or the like, as known in the art. In some embodiments, the lignin is plasticized with solvents or plasticizers to induce melt-processability. Solvents and plasticizers include, for example, dimethylsulfoxide, dimethylacetamide, polyoxyalkylene, ethylene carbonate, propylene carbonate, and glycerol, as known in the art. In some embodiments, the use of a solvent or plasticizer is excluded.

In different embodiments, the lignin (either isolated or extracted lignin from biomass or its crosslinked derivative) has a glass transition temperature of precisely or about, for example, 40° C., 50° C., 60° C., 70° C., 80° C., 90° C., 100° C., 105° C., 110° C., 115° C., 120° C., 125° C., 130° C., 140° C., 150° C., 160° C., 170° C., 180° C., 190° C., 200° C., 210° C., 220° C., 230° C., or 240° C., or a $T_g$ within a range bounded by any two of the foregoing values. In some embodiments, the lignin does not exhibit a detectable $T_g$, unless mixed with a plasticizing component such as solvent, or polymeric additives. In some embodiments, lignin undergoes a degradation reaction before exhibiting a discernible $T_g$.

The lignin (in either raw form isolated from biomass or a crosslinked derivative) may be substantially soluble in a polar organic solvent or aqueous alkaline solution. As used herein, the term "substantially soluble" generally indicates that at least 1, 2, 5, 10, 20, 30, 40, 50, or 60 grams of the lignin completely dissolves in 1 deciliter (100 mL) of the polar organic solvent or aqueous alkaline solution. In other embodiments, the solubility is expressed as a wt % of the lignin in solution. In some embodiments, the lignin has sufficient solubility to produce at least a 5 wt %, 10 wt %, 15 wt %, 20 wt %, 30 wt %, 40 wt %, or 50 wt % solution in the polar organic solvent or aqueous alkaline solution. The polar organic solvent can be aprotic or protic. Some examples of polar aprotic solvents include the organoethers (e.g., diethyl ether, tetrahydrofuran, and dioxane), nitriles (e.g., acetonitrile, propionitrile), sulfoxides (e.g., dimethylsulfoxide), amides (e.g., dimethylformamide, N,N-dimethylacetamide), organochlorides (e.g., methylene chloride, chloroform, 1,1,-trichloroethane), ketones (e.g., acetone, 2-butanone), and dialkylcarbonates (e.g., ethylene carbonate, dimethylcarbonate, diethylcarbonate). Some examples of polar organic protic solvents include the alcohols (e.g., methanol, ethanol, isopropanol, n-butanol, t-butanol, the pentanols, hexanols, octanols, or the like), diols (e.g., ethylene glycol, diethylene glycol, triethylene glycol), and protic amines (e.g., ethylenediamine, ethanolamine, diethanolamine, and triethanolamine). The aqueous alkaline solution can be any aqueous-containing solution having a pH of at least (or over) 8, 9, 10, 11, 12, or 13. The alkalizing solute can be, for example, an alkali hydroxide (e.g., NaOH or KOH), ammonia, or ammonium hydroxide. Combinations of any of these solvents may also be used.

In some embodiments, the lignin dispersion does not contain a surfactant, which may be any of the surfactants or surface-active agents known in the art. Some examples of surfactants being excluded are those containing a lipophilic moiety attached to a hydrophilic moiety as well as those containing negative or positive charged groups (e.g., sulfate, sulfonate, phosphate, phosphonate, or quaternary ammonium) and highly hydrophilic groups, such as polyalkylene oxide groups and saccharide-based (e.g., sorbitan-based) groups.

In another aspect, the present disclosure is directed to a method for producing the lignin dispersion described above. In the method, a lignin source, which may be selected from any of the lignins or crosslinked or chemically modified variations thereof, as described above, and which may have any of the exemplary particle sizes, ranges thereof, and distributions thereof, as described above, is dissolved in an organic solvent substantially devoid of water yet miscible with water to result in a solution of the lignin in the organic solvent. The term "miscible," as used herein, indicates complete miscibility of the organic solvent with water at all concentrations under standard conditions or at an elevated temperature. The term "organic solvent," as used herein, generally refers to an organic substance having a melting point of no more than or less than 40° C., and more typically, no more than or less than 30, 25, 20, 15, 10, 0, −10, −20, −30, or −40° C. The organic solvent may also be a solvent solution containing two or more organic solvents, wherein the solvent solution is devoid of water yet miscible with water and can substantially or completely dissolve the lignin.

The lignin source is intimately and thoroughly mixed with the organic solvent by any of the mixing or blending methods known in the art. In some embodiments, the mixing process is conducted at room temperature (typically, 18-30° C., or approximately 20° C. or 25° C.). In other embodiments, the solvent in admixture with lignin is heated to a temperature above room temperature during the mixing process, provided that the temperature is not more than or is below 50° C., 100° C., or 150° C., or the temperature is below the boiling point of the organic solvent and less than the decomposition temperature ($T_d$) of the lignin, where $T_d$ can be, for example, about 240° C., 230° C., 240° C., 230° C., 220° C., 210° C., or 200° C. Any insoluble lignin material, if produced or otherwise present during the dissolution process, is generally removed, e.g., by any suitable method known in the art, such as by centrifugation, filtration, or gravimetric settling followed by decanting.

In some embodiments, the organic solvent used for dissolving the lignin is selected from among any of the organic solvents described earlier above, provided that the organic solvent is devoid of water yet miscible with water and can substantially dissolve (e.g., at least 95%) or completely dissolve the lignin. If a minor portion (e.g., up to 1, 2, or 5 wt %, or less) of the lignin remains insoluble in the organic solvent, such minor portion can be removed before proceeding with the next step of dialysis.

In a first set of embodiments, the organic solvent in which the lignin is dissolved is or includes a ketone solvent. Some examples of ketone solvents include acetone, diacetone alcohol (4-hydroxy-4-methylpentan-2-one), acetoin, and hydroxyacetone. In a second set of embodiments, the organic solvent in which the lignin is dissolved is or includes an alcohol solvent. Some examples of alcohol solvents include methanol, ethanol, 1-propanol, 2-propanol, ethylene glycol, propylene glycol, diethylene glycol, and glycerol. In a third set of embodiments, the organic solvent in which the lignin is dissolved is or includes a nitrile solvent. Some examples of nitrile solvents include acetonitrile, propionitrile, and 3-hydroxypropanenitrile. In a fourth set of embodiments, the organic solvent is or includes an ether, such as 1,2-dimethoxyethane and 1,4-dioxane. The organic solvent may alternatively be or include a high polarity high boiling solvent, such as dimethylsulfoxide (DMSO) or hexamethylphosphoramide (HMPA). In other embodiments, the organic solvent is or includes an ionic liquid, such as any of the numerous imidazolium-based, ammonium-based, and pyridinium-based ionic liquids well known in the art. A combination of two or more of the foregoing classes or specific types of solvents may also be used as the organic solvent. In some embodiments, any one or more of the above classes or specific types of organic solvents are excluded as solvents.

Following the dissolution of the lignin in the organic solvent, as set forth above, the solution of the lignin is dialyzed with water over a period of time until substantially all of the organic solvent is replaced with water. In some embodiments, the water is a deionized water. During the dialysis, as the organic solvent is increasingly replaced with water, the lignin becomes less soluble in the organic solvent-water mixture. Eventually, with increasing water content, the lignin reduces in solubility to the extent that lignin strands and networks begin aggregating into microscopic spherical particles. Thus, the dialysis process proceeds along with simultaneous formation of spherical lignin particles dispersed in the water, wherein the spherical lignin particles have a size exclusively within a range of 100 nm to 5 microns or within any sub-range therein, as described earlier above. Typically, the dispersed lignin particles are formed along with flocculated (precipitated) lignin matter. If flocculated matter is produced, the flocculated matter is typically removed (separated) from the lignin dispersion. The flocculated matter can be removed by any means well known in the art for removing a solid from a liquid, provided that the separation method does not also remove or other disrupt the dispersed lignin particles. In one embodiment, the separation process includes centrifugation of the aqueous lignin dispersion followed by selectively retrieving (e.g., decanting or siphoning) of the supernatant, wherein the supernatant contains the dispersed lignin particles but not the flocculated material. In another embodiment, the separation process includes filtration of the aqueous lignin dispersion through a filter that can allow the dispersed lignin particles to pass through while preventing passage of the flocculated material. Notably, the particle size distribution of the dispersed lignin particles can be further selected by passing the aqueous lignin dispersion through a filter having a cut-off size within a range of 100 nm to 5 microns. For example, if desired, a 2-micron filter can remove dispersed lignin particles having a size above 2 microns.

The process of producing the lignin dispersion, as described above, may also be integrated with a lignin-producing process. The lignin-producing process may be, for example, a pulp or paper manufacturing process, or a biorefinery process. Typically, biorefineries produce ethanol (as a product) and lignin (as a byproduct) from a lignocellulosic biomass source. Some examples of suitable lignocellulosic biomass materials include wood, corn stover, corn husks, *Populus* (e.g., poplar, aspen, and/or cottonwood), switchgrass (i.e., *Panicum virgatum*), miscanthus, sugarcane, paper pulp, nut hulls, and hemp. In a biorefinery, biomass is generally initially pre-treated by boiling, steaming, and/or with dilute acid to loosen cellulose, hemicellulose, and other carbohydrate components in biomass from lignin. This pretreatment process is generally followed by saccharification (i.e., production of sugar, such as glucose, by use of a cellulase enzyme on cellulose), and then fermentation of the sugar by enzymes and/or an ethanologen microbe (e.g., yeast) to produce ethanol. Due to the relatively mild chemical process generally employed in a biomass-to-ethanol biorefinery, the lignin residue emanating from the biorefinery is generally less degraded and more conserved from its natural state, and generally has a higher molecular weight, than that isolated from conventional pulp processing operations, such as the Kraft pulping industry. By being "integrated", the equipment used in extracting or chemically modifying the lignin (by methods described above) is typically contained within or physically interconnected with the equipment used in the lignin-producing operation. For example, the lignin-producing operation may include a lignin precipitation or extraction vessel, from which lignin, after being obtained, is transferred by suitable mechanical means to a lignin extraction or chemical modification station in which the source lignin is extracted with a nitrile solvent and/or chemically modified.

In another aspect, the present disclosure is directed to a process for stabilizing an emulsion by intimately mixing (e.g., by vigorously shaking) the emulsion with any of the lignin dispersion compositions described above. The term "stabilizing," as used herein, indicates an ability of the lignin dispersion to lengthen the period of time for the emulsion to remain unseparated (i.e., as an emulsion and not as a bulk two-phase or higher phase system) by virtue of the presence of the lignin dispersion, compared to the shorter period of time the emulsion remains unseparated in the absence of the lignin dispersion. The lignin dispersions can render an emulsion stable for a period of, for example, at least one, two, three or more months, whereas the emulsion in the absence of the lignin dispersion may be unstable starting at preparation or become unstable within a few days or weeks. The emulsion contains at least two or three immiscible liquids. Some examples of emulsions containing two immiscible liquids include, for example, oil-in-water (o/w) and water-in-oil (w/o) types of emulsions, or more generally, "non-polar in polar" (np/p) and "polar in non-polar" (p/np) types of emulsions. The foregoing emulsions contain two immiscible liquids in two phases. The emulsion may also contain three phases and contain two or three immiscible liquids, such as in an oil-in-water-in-oil (o/w/o) or water-in-oil-in-water (w/o/w) double emulsion, or more generally, a np/p/np or p/np/p double emulsion.

In some embodiments, the emulsion is composed of or includes hydrophobic liquid droplets (e.g., oil, hydrocarbon, or halohydrocarbon liquid droplets) suspended in a liquid aqueous or alcohol matrix or other hydrophilic matrix (e.g., ionic liquid) in which the hydrophobic liquid is immiscible. The hydrophobic liquid droplets are suspended in the liquid aqueous or alcohol matrix by virtue of the substantial immiscibility of the hydrophobic compound(s) with aqueous or alcohol solvents. The aqueous matrix may be solely water or water in admixture with a water-soluble solvent (e.g., a water-soluble alcohol or acetone or acetonitrile), wherein the admixture, if present, is substantially immiscible with the hydrophobic compound(s). The alcohol solvent is typically a lower alcohol, such as methanol or ethanol or admixture thereof, to ensure substantial immiscibility with the hydrophobic droplets. The oil can be selected from among any of the oils known in the art. As generally understood, the term "oil" refers to a liquid hydrophobic substance (under standard conditions) having a high boiling point, typically at least or above 150° C. or 200° C., and which is immiscible with water or methanol. The oil may be, for example, one or a mixture of high boiling hydrocarbons, such as selected from nonane, decane, undecane, dodecane, tridecane, tetradecane, pentadecane, hexadecane, heptadecane, octadecane, and higher hydrocarbons, as well as branched isomers and unsaturated versions (e.g., alkenes) thereof. In some embodiments, the oil corresponds to a petroleum fraction, such as gasoline, crude oil, diesel, or jet fuel. In other embodiments, the oil is selected from one or a mixture of mono-, di-, or tri-glyceride compounds, such as found in plant oils and animal fats, e.g., peanut oil, palm oil, olive oil, cottonseed oil, sunflower oil, linseed oil, and the like. In the case of liquid hydrocarbon droplets, the droplets can be composed of or include any liquid hydrocarbon, including the high boiling compounds described above, but also including lower boiling hydrocarbon compounds, such as butane, n-pentane, isopentane, neopentane, n-hexane, isohexane, 2,2-dimethylbutane, n-heptane, isoheptane, octane, isooctane, benzene, toluene, and the xylenes. In the case of liquid halohydrocarbon droplets, the droplets can be composed of or include any liquid halohydrocarbon, such as a fluorohydrocarbon, chlorohydrocarbon, or bromohydrocarbon. The halohydrocarbon may correspond to a halogenated version of any of the hydrocarbons or oils described above. Some examples of halohydrocarbons include perfluorohexane, perfluorooctane, methylene chloride, chloroform, carbon tetrachloride, trichloroethylene, perchloroethylene, bromochloromethane, bromoethane, and 1-bromopropane. In some embodiments, the liquid hydrophobic droplets include a mixture of any two or more of the above exemplary hydrophobic classes or specific types of compounds.

In other embodiments, the emulsion is composed of or includes hydrophilic liquid droplets suspended in a hydrophobic liquid matrix, wherein the hydrophilic liquid is substantially immiscible with the hydrophobic liquid. The hydrophilic liquid droplets are suspended in the hydrophobic liquid matrix by virtue of the substantial immiscibility of the hydrophilic liquid compound(s) with the hydrophobic liquid compound(s). The hydrophobic matrix may be selected from, for example, any of the hydrophobic substances described above, e.g., an oil, hydrocarbon, or halohydrocarbon, or mixture thereof. The hydrophilic liquid can be composed of, for example, any of the hydrophilic substances described, e.g., water, alcohol, ketone solvent (e.g., acetone), nitrile solvent (e.g., acetonitrile), or ionic liquid, provided the hydrophilic liquid is substantially immiscible with the hydrophobic liquid.

Without being bound by theory, and based on the preliminary evidence found herein, it is believed that the lignin particles stabilize the emulsion by unraveling (i.e., spontaneously unfolding) when mixed into the emulsion and forming a lignin sheet having a nanoscopic thickness (e.g., 5-50 nm or 5-20 nm) at the liquid-liquid interface of the at least two or three immiscible liquids. Moreover, the evidence suggests that the lignin sheets reach a jammed state at the interface and form a large-scale surfactant sheet as the packing density increases. The concept of jamming characterizes how disordered particle systems transition from fluid-like to solid-like states. In the present case, the lignin sheets are in a fluid-like state at the interface before jamming, but they become a solid-like state after jamming. When the lignin concentration is low at the interface, the lignin particles open up and form a sheet-like structure of nanoscopic thickness. At this stage, if the concentration remains low, the lignin sheets remain mobile. After a critical concentration, the lignin sheets get jammed and at that point the lignin molecules are no longer rigid. Unless the concentration is reduced, the integrated jammed sheet can fold, form a crease, and behave as a mechanically robust film. The jamming process is a physical assembly of the expanded sheets, and these sheets can reassemble reversibly to a mobile phase if the concentration is reduced by pushing more water inside. Thus, the jammed state is a physically assembled state in which the lignin sheets are no longer mobile.

In another aspect, the present disclosure is directed to a method for producing a solid hierarchical assembly of porous microparticles by use of the above described lignin dispersion. In a first step, an emulsion containing at least two immiscible liquids, as described above, is intimately mixed with the lignin dispersion and an amphiphilic block copolymer (ABC). The ABC may be, more specifically, an amphiphilic diblock, triblock, or tetrablock copolymer, wherein the blocks may be arranged randomly or in alternating fashion. As well known in the art, an ABC contains at least one copolymer block having a more hydrophilic or hydrophobic character than another copolymer block, wherein the difference in hydrophilicity and hydrophobicity between the different blocks should be sufficient to cause the ABC to organize itself into hydrophilic and hydrophobic domains when in solution. By virtue of the self-arranging property of the ABC, most ABCs are capable of forming macroscopic (supramolecular) self-assembled patterned structures, such as micelles, liposomes, or membrane-like polymer brushes. The foregoing mixing step results in formation of a lignin sheet of nanoscopic thickness (e.g., 5-20 nm) at the liquid-liquid interfaces between the at least two immiscible liquids, as described above, and also simultaneously forming a double emulsion (as described above, e.g., w/o/w or o/w/o) containing the at least two immiscible liquids. In the double emulsion, each microparticle corresponds to a droplet of a first immiscible phase encapsulated by the ABC, wherein the foregoing encapsulated droplet of first immiscible phase is dispersed within a second immiscible phase. The interface between the microparticle surface and second immiscible phase contains the ABC and also contains the lignin sheets, described above, to stabilize the primary emulsion between first and second immiscible phases. Within each droplet of first immiscible phase encapsulated by the ABC are smaller droplets of the second immiscible phase. The interface between the smaller droplets and first immiscible phase also contain ABC and lignin sheets to stabilize the secondary emulsion within each droplet. The first and secondary emulsions together form the double emulsion.

Amphiphilic block copolymers (ABCs) are well known in the art, such as described in detail in S. Y. Avsar et al., *Front. Chem.*, 6:645, Jan. 8, 2019, doi: 10.3389/fchem.2018.00645 and C. Li et al., *Nanoscale*, 11, 2299-2305, 2019, the contents of which are herein incorporated by reference. Any such ABC can be employed in the presently described process for producing a solid hierarchical assembly. In some particular embodiments, the ABC includes at least one polyalkylene oxide block, such as a polyethylene oxide (PEO), polypropylene oxide (PPO), or polybutylene oxide (PBO) block or a combination thereof, e.g., PEO and PPO blocks. In other particular embodiments, the ABC includes at least one polycaprolactone (PCL), polyacrylate (PA), polymethacrylate (PMA), poly(butyl acrylate), polymethylmethacrylate (PMMA), polylactide (PL), polystyrene (PS), polyisoprene, polyethylene (PE), polypropylene (PP), polybutadiene (PB), polysiloxane, polysaccharide (e.g., chitosan or starch), polyacrylonitrile, polyacrylamide, poly(dimethylacrylamide), or poly(2-methyloxazoline) block. In some embodiments, the ABC contains at least one lipophilic polyvinylhydrocarbon block, such as PE, PP, PB, or PS. In further embodiments, the ABC contains at least one lipophilic polyvinylhydrocarbon block and at least one hydrophilic polyalkylene oxide block, such as PEO, PPO, PBO, or combination thereof. In some embodiments, the ABC includes two or three of any of the foregoing exemplary copolymer blocks, provided that the resulting copolymer functions as an amphiphilic block copolymer with ability to form a self-assembled supramolecular structure. A particular class of amphiphilic block copolymers include those composed of polystyrene (PS) and hydrophilic (e.g., polyalkylene oxide, such as PEO and/or PPO) copolymer blocks, such as described in M. Ohshio et al., *Polymer Journal*, 52, 189-197, 2020, the contents of which are herein incorporated by reference.

After intimately mixing an emulsion containing at least two immiscible liquids with an ABC and the lignin dispersion to form a double emulsion, as described above, the double emulsion is spread onto (or over) a surface to produce a film of the double emulsion. The double emulsion can be spread onto a surface by any of the means well known in the art for coating a substrate with a liquid film. The double emulsion can be spread on the substrate by, for example, dipping the substrate into the double emulsion, or brushing, spraying, or spin-coating the double emulsion onto a substrate. Depending on the film formation process, viscosity of the double emulsion, and other factors, the thickness of the double emulsion film may be no more than or less than 100 microns, 50 microns, 20 microns, 10 microns, 5 microns, 1 micron, 500 nm, 200 nm, or 100 nm, or a thickness within a range bounded by any two of the foregoing values.

Following production of a film of the double emulsion, the film of the double emulsion is subjected to conditions in which the two immiscible liquids evaporate to produce a solid film containing a hierarchical assembly of porous (generally spherical) microparticles. Evaporation of the immiscible liquids results in empty pores previously occupied by the immiscible liquids. The hierarchical assembly contains, as a first level of organization, an assembly of interconnected microparticles, with each microparticle defined by an outer membrane constructed of the ABC and lignin sheets. The rigidity of the lignin sheets offers the structural integrity of the empty microparticles. The hierarchical assembly contains, as a second level of organization, an assembly of interconnected smaller hollow particles ("pores") within each microparticle. Each smaller hollow particle is also defined by a membrane constructed of the ABC and lignin sheets. Depending on the compositions and concentrations used for the components in the double emulsion, the microparticles may have a size of, for example, 100 microns, 50 microns, 20 microns, 10 microns, 5 microns, 2 microns, or 1 micron, or a size within a range bounded by any two of the foregoing values. The smaller hollow particles (pores) within each microparticle may have a size of, for example, 50 microns, 20 microns, 10 microns, 5 microns, 2 microns, 1 micron, 0.5 microns, or 0.2 microns, or a size bounded by any two of the foregoing values.

In some embodiments, the hierarchical assembly of porous microparticles is modified to impart it with greater rigidity or strength. In some embodiments, the hierarchical assembly is crosslinked to render the hierarchical assembly more rigid. The hierarchical assembly can be crosslinked by reacting it with a reactive crosslinking substance, such as boric acid, formaldehyde, or a dialdehyde, wherein the foregoing crosslinking substances are generally reactive with the lignin component. Alternatively, the crosslinking substance may be selected to crosslink reactive groups on the ABC, if such groups are present on the ABC. Moreover, in some embodiments, the ABC is selected to contain reactive groups (e.g., amine, carboxylic acid, amide, or ester groups) that can undergo crosslinking. Either with or without crosslinking, the hierarchical assembly may or may not also include one or more additional components that increase the rigidity or strength of the hierarchical assembly. Some additional components include, for example, carbon particles, metal particles, silicon-containing particles (e.g., silica or silicate particles), and metal oxide compounds. In some embodiments, one or more such modifying agents are present in an amount of up to or less than 40, 30, 20, 15, 10, 5, 4, 3, 2, or 1 wt % by weight of the hierarchical assembly. In other embodiments, or one or more such additional components are excluded from the hierarchical assembly.

The carbon particles, if present in the hierarchical assembly, can be any of the carbon particles known in the art that are composed at least partly or completely of elemental carbon, and may be conductive, semiconductive, or non-conductive. The carbon particles may be nanoparticles (e.g., at least 1, 2, 5, or 10 nm, and up to 20, 50, 100, 200, or 500 nm), microparticles (e.g., at least 1, 2, 5, or 10 µm, and up to 20, 50, 100, 200, or 500 µm), or macroparticles (e.g., above 500 µm, or at least or up to 1, 2, 5, 10, 20, 50, or 100 mm). Some examples of carbon particles include carbon black ("CB"), carbon onion ("CO"), a spherical fullerene (e.g., buckminsterfullerene, i.e., $C_{60}$, as well as any of the smaller or larger buckyballs, such as $C_{20}$ or $C_{70}$), a tubular fullerene (e.g., single-walled, double-walled, or multi-walled carbon nanotubes), carbon nanodiamonds, carbon nanohorns, and carbon nanobuds, all of which have compositions and physical and electrical properties well-known in the art. As known in the art, fully graphitized carbon nanodiamonds can be considered to be carbon onions.

Metal particles, if present in the hierarchical assembly, may be included to modulate the electrical conductivity, thermal conductivity, strength, or magnetic properties of the composition. The metal particles may be composed of or include, for example, iron, cobalt, nickel, copper, zinc, palladium, platinum, silver, gold, aluminum, silicon, or tin, or a combination thereof. The metal particles may include at least a portion of the metal in its elemental (zerovalent) state. The metal particles may alternatively have a metal carbide, metal nitride, or metal silicide composition. In some embodiments, any one or more classes or specific types of the foregoing metal particles (or all metal particles) are excluded from the hierarchical assembly.

Metal oxide compounds, if present in the hierarchical assembly, can have any metal oxide composition, typically particulate in form, which can function to improve a physical characteristic of the hierarchical assembly. The metal of the metal oxide composition can be, for example, an alkali metal, alkaline earth metal, main group metal, transition metal, or lanthanide metal. Some examples of alkali metal oxides include $Li_2O$, $Na_2O$, $K_2O$, and $Rb_2O$. Some examples of alkaline earth metal oxide compositions include BeO, MgO, CaO, and SrO. Some examples of main group metal oxide compositions include $B_2O_3$, $Ga_2O_3$, SnO, $SnO_2$, PbO, $PbO_2$, $Sb_2O_3$, $Sb_2O_5$, and $Bi_2O_3$. Some examples of transition metal oxide compositions include $Sc_2O_3$, $TiO_2$, $Cr_2O_3$, $Fe_2O_3$, $Fe_3O_4$, FeO, $Co_2O_3$, $Ni_2O_3$, CuO, $Cu_2O$, ZnO, $Y_2O_3$, $ZrO_2$, $NbO_2$, $Nb_2O_5$, $RuO_2$, PdO, $Ag_2O$, CdO, $HfO_2$, $Ta_2O_5$, $WO_2$, and $PtO_2$. Some examples of lanthanide metal oxide compositions include $La_2O_3$, $Ce_2O_3$, and $CeO_2$. In some embodiments, mixed metal oxides (mixed composition of any of the above-mentioned metal oxides) are hierarchically assembled. In some embodiments, any one or more classes or specific types of the foregoing metal oxides (or all metal oxides) are excluded from the hierarchical assembly.

In some embodiments, these hierarchically porous lignin surfactant particles can be used as a porous polymer filler in various polymer matrices for thermal insulation and pigment applications. Porous filler filled polymer systems can be processed as a foam. The metal oxide particles can also be used in ceramic fabrication, catalysis, energy and gas storage application, gas sensing applications, and in electronics (e.g., diodes, resistors, transistors, and the like).

Examples have been set forth below for the purpose of illustration and to describe certain specific embodiments of the invention. However, the scope of this invention is not to be in any way limited by the examples set forth herein.

Examples

Production of a Lignin Dispersion

Spherical lignin nanoparticles were prepared by dialysis, during which the once solubilized lignin aggregated into particles due to the progressive loss of solubility. The softwood Kraft-treated lignin was isolated and provided by a pulping mill. The lignin was first dissolved in acetone at a concentration of 10 mg mL$^{-1}$. Subsequently, the solution was filtered through a 0.45 μm syringe filter and transferred into a dialysis bag which was made of regenerated cellulose (Fisher brand, No. 21-152-14). The dialysis bag was immersed into deionized water for 72 hours. Then, the lignin particle dispersion was retrieved from the dialysis bag and centrifuged at 2000 rpm for 5 minutes, and the supernatant was retrieved for the following experimentation.

To understand the size and morphology of the particles, the particle dispersion was dried on a silicon wafer and prepared for morphology characterization by SEM (Hitachi S4800). The concentrations of lignin aqueous solution were obtained by thermogravimetric analysis (TGA) that provided the weight of lignin nanoparticle after water evaporation.

Different from traditional rigid particles (inorganic particles), soft polymer particles preserve the rigid spherical shape in bulk solution but strongly deform, swell, and flatten at an oil/water interface (e.g., A. M. Rumyantsev et al., *Soft Matter*, 12, 6799, 2016). As opposed to conventional soft particles that are covalently crosslinked, the present work created a new "soft particle" that is physically interconnected and prepared from a biomass-derived material—lignin, which further formed large-scale surfactant sheets by reassembly and flattening at the interface. As shown in the scheme in FIG. 1A, lignin particles were prepared by gradually exchanging the solvent from acetone (a suitable solvent) to water (an antisolvent). During the exchanging process, the lignin chains collapsed and aggregated into particles due to a loss of solubility. FIG. 1B shows a scanning electron microscope (SEM) image of the lignin particles produced in the aqueous phase. As shown in FIG. 1B, a homogenous dispersion was obtained with uniform particles in a diameter around 500 nm.

Stabilization of an Emulsion Using the Lignin Dispersion

The following experiments describe in situ formation of a large-scale surfactant sheet with strong interfacial activities by interfacial jamming of poorly soluble amphiphilic lignin macromolecules in particulate form at an oil/water interface. The amphiphilic nature of the surfactant sheet permits wrapping of either water or oil droplets, while its rigidity permits it to hold the liquid phases in various non-equilibrium morphologies. The surfactant sheet is physically networked by reversible hydrogen bonding and π-π interaction, which endows it with transforming and self-healing ability. The strong interfacial activity of the surfactant sheet results in an interfacial instability, which drives evolution of interfacial morphology and novel wrapped microstructures.

Figure 1C:
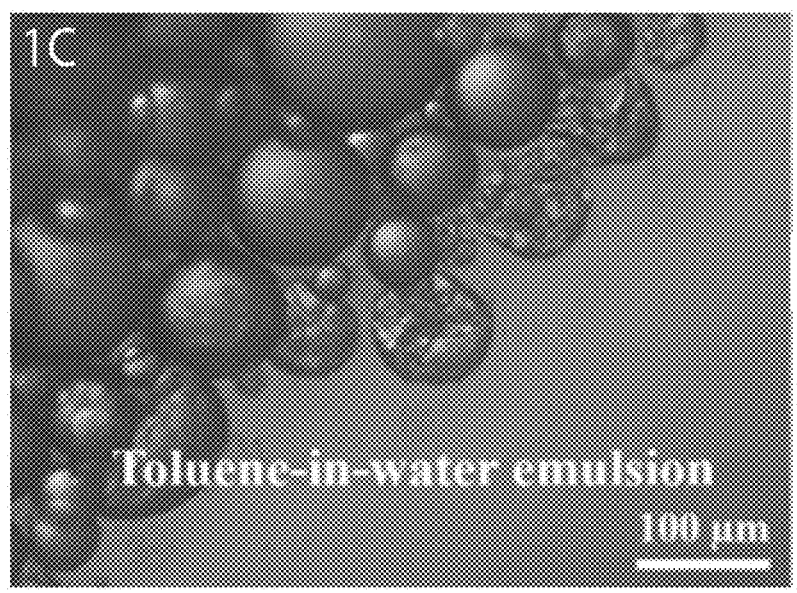

Owing to lignin's hydrophobic aromatic backbone and hydrophilic functional groups, i.e., hydroxyls, carboxyls, and aldehydes, the lignin particles exhibited a strong interfacial activity that drove them to self-assemble at a toluene/water interface. This resulted in a stable emulsion of lignin particles that was stable for over one month as observed under optical microscopy (FIG. 1C). The strong interfacial activity was evidenced in the dynamic interfacial tension measurement at the water/toluene interface (FIG. 1D), in which the interfacial tension decreased from 38 to 17 mN m$^{-1}$. With increasing lignin concentration in aqueous dispersion, the dynamic interfacial tension at any time interval decreased significantly.

Emulsion Preparation: Emulsions were prepared by shaking an oil/water mixture with a volume ratio of 1:9. The water phase contained 0.04 mg mL$^{-1}$ lignin nanoparticles while the oil phase was toluene. The oil droplets dispersed in water were first characterized under an optical microscope. Then the emulsions were drop cast on a silicon wafer and dried overnight to remove the solvent. The morphologies of dried droplets were characterized by SEM.

Thickness Measurement by AFM: The large-scale surfactant sheet was prepared by carefully adding toluene at the top of water phase, which contains 0.04 mg mL$^{-1}$ lignin nanoparticles, in a vial. The vial was left still in a hood for 48 hours. A visible interface was formed between water and toluene where the lignin nanoparticles self-assembled and formed the surfactant sheet. Then the surfactant sheet was collected by floating the film on a silicon wafer by inserting the silicon wafer into the vial, during which wrinkles were formed on the film. This surfactant sheet was characterized by optical microscopy and AFM. AFM images were recorded with a Cypher AFM microscope operating in the tapping mode in air using cantilevers with a spring constant of 30 N m$^{-1}$.

Interfacial Tension Measurement: The dynamic interfacial tension was measured by a pendant geometry in a tensiometer. A pendant droplet containing an aqueous dispersion of lignin particles was suspended in a continuous phase of toluene. The evolution of droplet shape with time was recorded by a camera and fitted by Young-Laplace equation to determine the dynamic interfacial tension.

Jamming Transition Reflected by Interfacial Tension Recovery: At the beginning, a pendant drop containing an aqueous dispersion of lignin particles was created and suspended from a syringe needle in toluene. And the syringe was fixed on a tensiometer which provided the automatic injection and suction, as well as the capability of measuring the interfacial tension at the oil/water interface. A decrease of droplet volume was made by withdrawing some liquid into the syringe, which resulted in a decrease of surface area at the same time. When the lignin nanoparticles self-assembled at the interface and reached the equilibrium state, the number of nanoparticles at the interface remains constant. Thus, a sudden decrease of interfacial tension was observed as a result of nanoparticle number increase during suction.

The Suction-and-Injection Experiment: The cyclic suction-injection experiment was conducted by removing and injecting liquid inside the droplet. A camera connected to the computer recorded the behavior and morphology change of droplet.

Figure 1D:
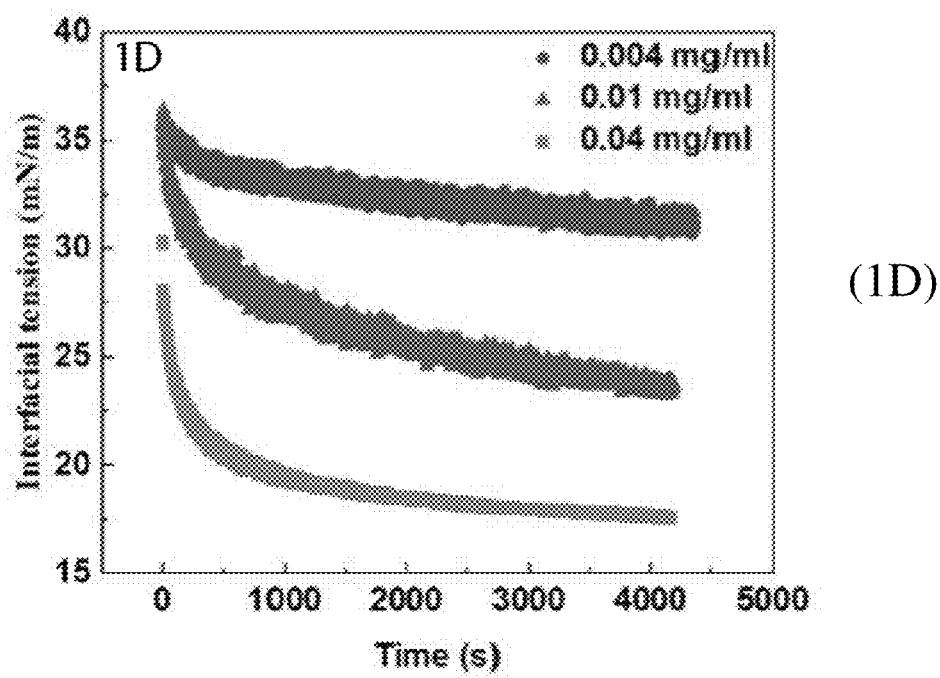
Figure 2A:
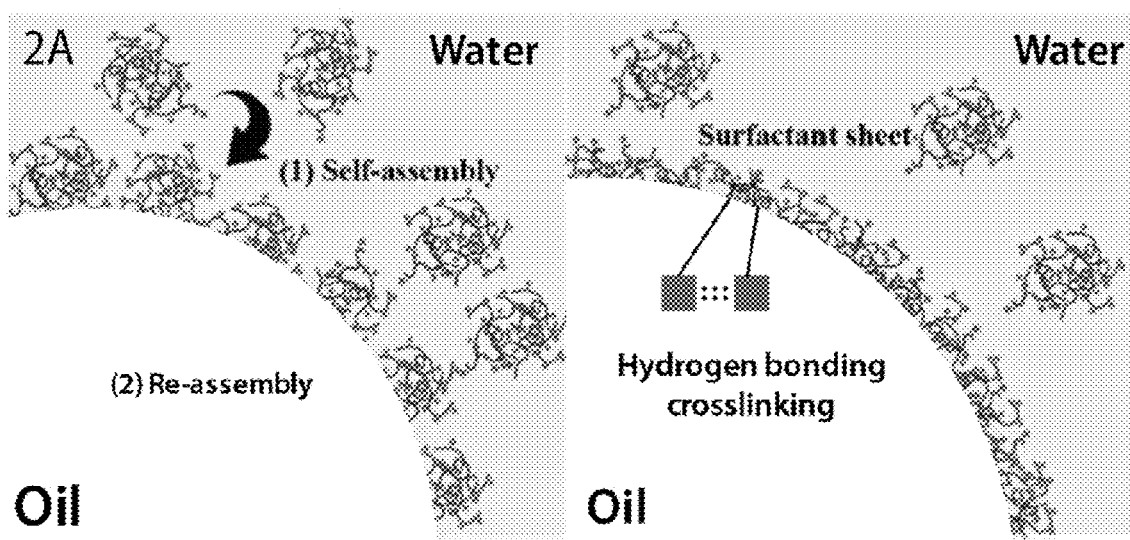
FIGS. 2A-2E. Large-scale surfactant sheet.

The very large number of functional groups that are attached to the lignin molecular backbone and capable of forming hydrogen bonding leads to the strong self-association and physical crosslinking inside of the particles. However, as shown in the schematic in FIG. 2A, self-assembled particles containing a non-polar backbone and polar functional groups reach the oil/water interface instantaneously to lower the interfacial tension (FIG. 2A, left panel). Upon contact with the interface, the lignin particles became deformed and flattened (FIG. 2A, right panel), ultimately forming a 2D surfactant sheet with an extreme aspect ratio. Different from conventional soft particles whose deformations were limited by particle elasticity due to covalent crosslinking, the lignin particles were completely spread out at the interface in the presence of weak crosslinking, i.e., hydrogen bonding. The driving force of spreading came from the reduction in interfacial energy by maximizing the surfactant covered area and decreasing the unfavorable contacts between oil and water. The oil/water systems were designed so that lignin had very limited solubility in both water and oil phases, e.g., toluene or dichloromethane (J. Sameni et al., *BioResources*, 12, p. 1548, 2017), which resulted in spreading instead of detaching of particles from the interface to the bulk solution. This phenomenon largely enhanced the efficiency of lignin particles' interfacial activity. As shown in FIG. 1D, the interfacial tension decreased by about 17 mN m$^{-1}$ at a low concentration of lignin particles (0.04 mg mL$^{-1}$ after 10 minutes of surface aging.

Figures 2B, 2C:
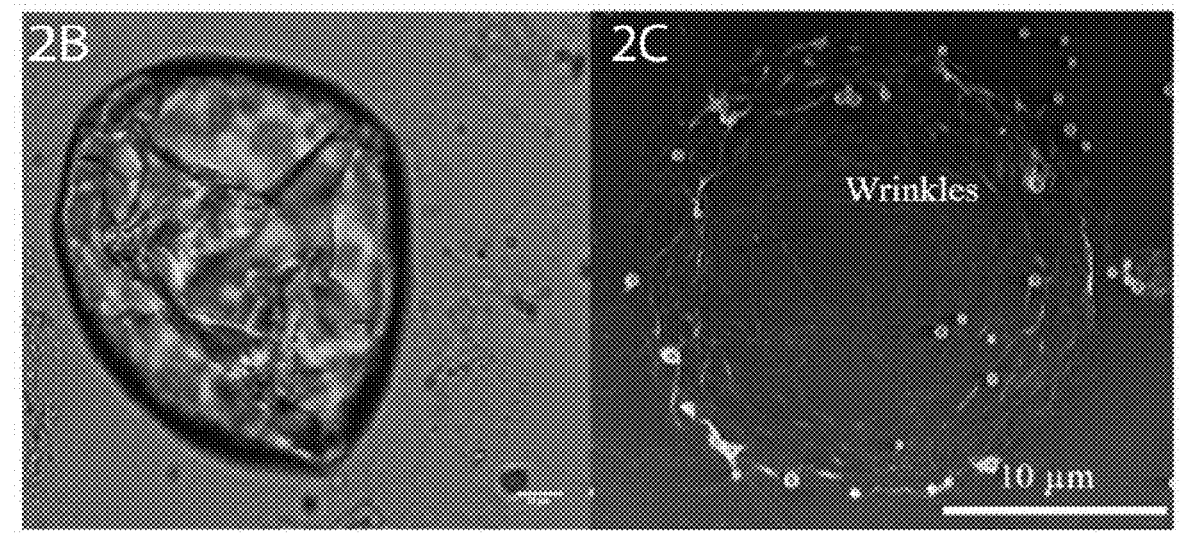

As shown in the optical micrograph in FIG. 2B, buckling was observed on the surface of a partially dried emulsion droplet under the optical microscope, indicating a solid-like interface. According to previous reports (e.g., S. U. Pickering, *J. Chem. Soc. Trans.*, 91, 1907, p. 2001-2021), such surfactant films at the interface were often a collection of jammed particles. If that was the case, the lignin surfactant film in this work would have a rough surface because of the aggregation of particles. However, as shown in the scanning electron microscopy (SEM) image of a dried emulsion droplet in FIG. 2C, the solid-like film lacked the expected roughness, and only a few crumpled geometries, like wrinkles, occurred occasionally.

Figure 2D:
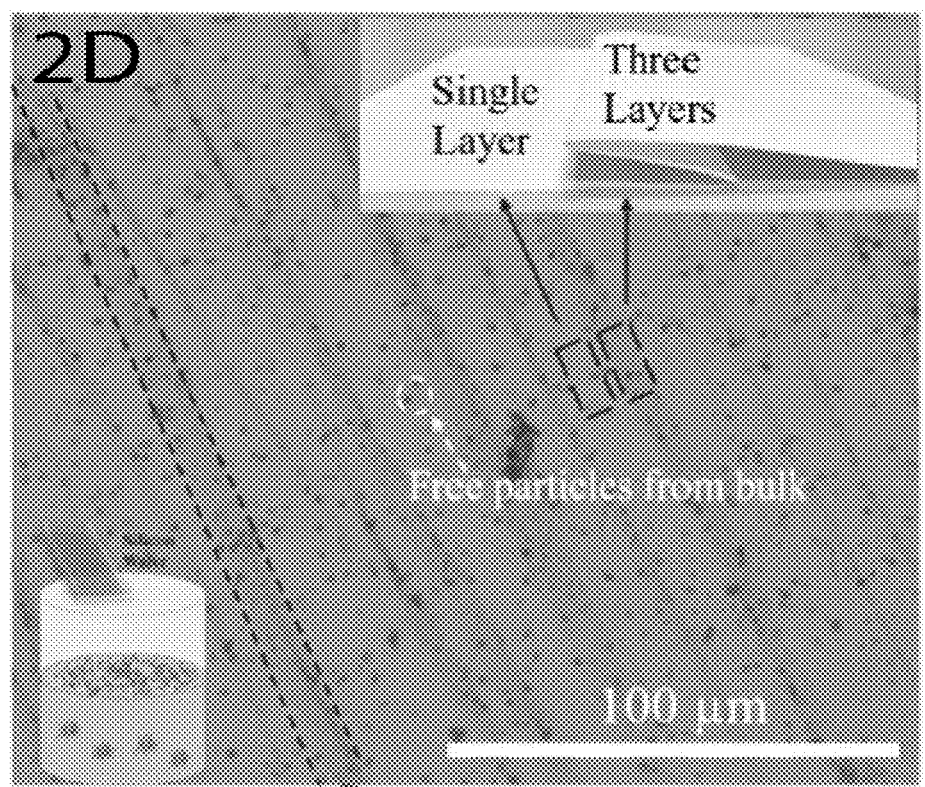

Another unexpected discovery was the thickness of a floating film at the toluene/water interface. Because of the minimal elastic modulus, the thin film was easily bent or folded during the floating process. As shown in FIG. 2D, when the film was folded like the paper as shown in the inset of FIG. 2D, a wrinkle that has three layers of film would appear. In the meantime, because the substrate inevitably contacted free lignin particles from water during the floating process, the collected film always exhibited surface deposited particles of half micron diameters.

Figure 2E:
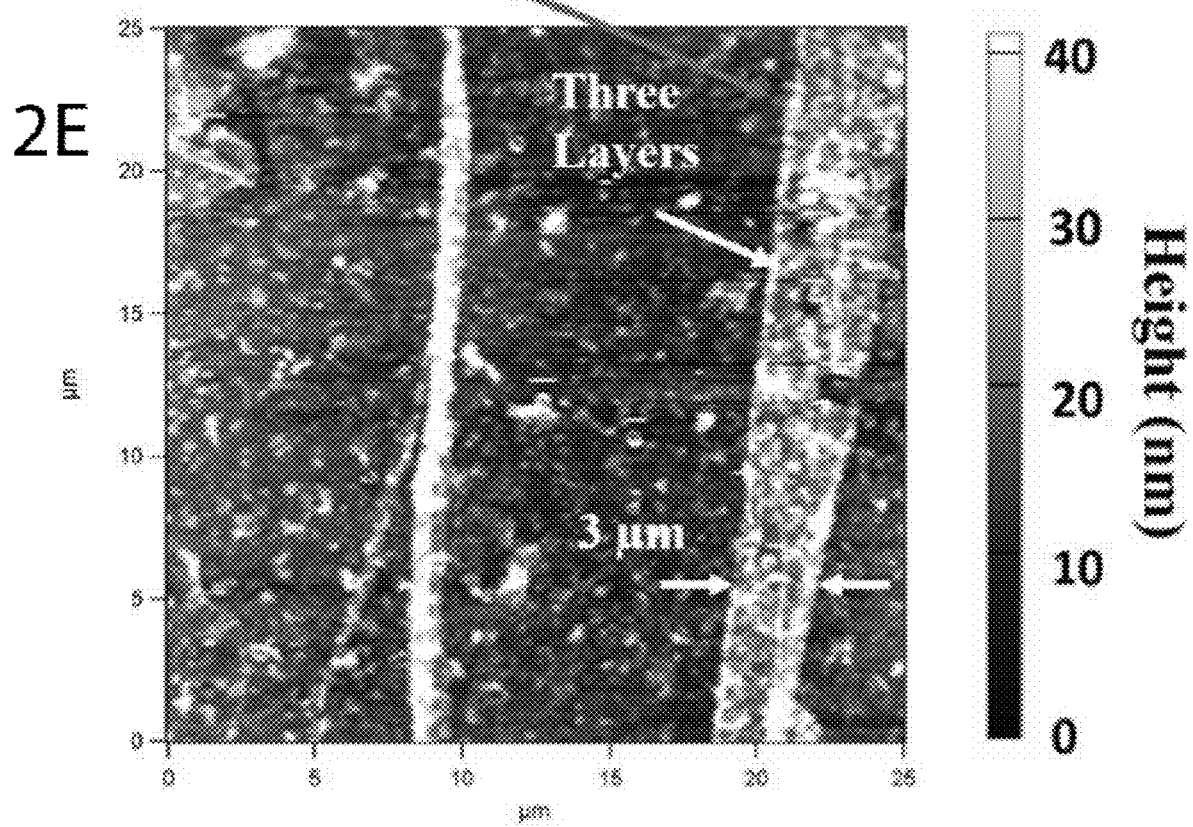

As shown by the atomic force microscopy (AFM) image in FIG. 2E, by measuring the height of the tri-layer wrinkles under, it was possible to calculate the thickness of one single layer of the thin film. If it was an interfacially jammed particle film, the thickness would be comparable to the particle diameter, i.e., 500 nm. However, based on the AFM measurement, the thickness of a floating film was only about several nm. This once again proved that the lignin surfactant films were not simply particles. Instead, the lignin particles deformed, flattened into thin sheets, and spread out at the interface, just like a thrown-out cast net.

The surfactant sheet is essentially formed through an interfacial jamming process, during which the packing density gradually increases until the interface reaches a solid-like state. Therefore, understanding the jamming process will help us understand the formation mechanism of lignin surfactant sheets. The jamming transition can be accelerated by abruptly increasing the packing density. As shown by the interfacial tension (IFT) vs. time plot in FIG. 3A, an abrupt withdrawal of interior fluid from the droplet led to a sudden decrease of interfacial tension, due to the increase of packing density. Since the system has already reached an equilibrium state, the total number of particles at the interface is fixed. Therefore, when the interfacial area is decreased, the particle packing density rises, which reduces the interfacial tension.

Figure 3A:
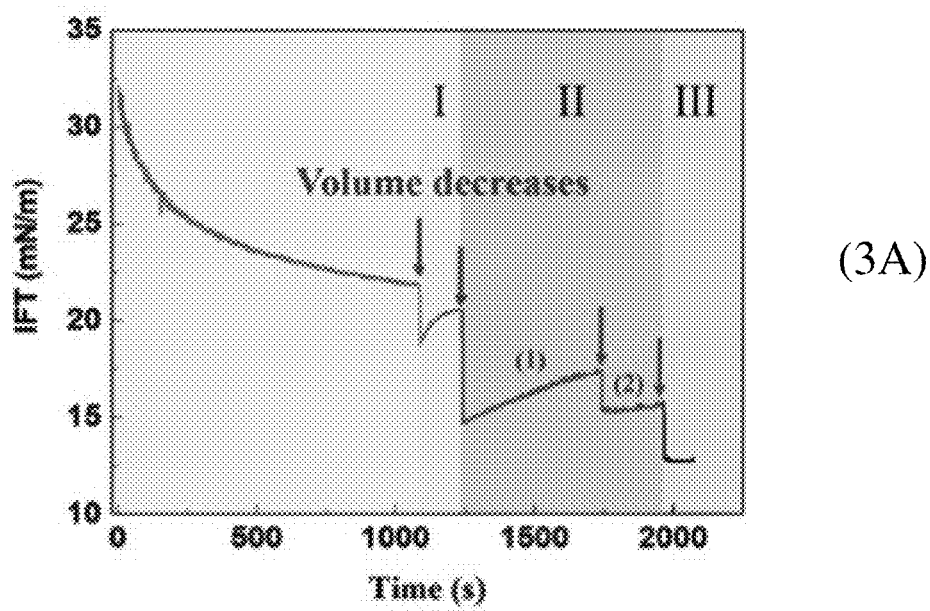
FIGS. 3A-3C.

On the other hand, measuring the recovery of interfacial tension after each droplet retraction probes the evolution of interfacial viscoelastic properties over the course of a jamming transition. In FIG. 3A, three types of interfacial tension recovery were identified, marking three different stages of interfacial restructuring during the formation of the lignin 2D sheet.

In the first stage, no wrinkles were formed at the interface after the droplet retraction, as the interface was not able to support the applied stress, and the applied stresses were spatially uniform. The interfacial tension recovered relatively fast, as compared with the next stage. This indicated a liquid-like diffusive state of particles at the interface in this stage. When the packing density was further increased and reached stage II, the recovery of interfacial tension slowed down after the droplet retraction because the particle assembly transitioned to a viscous state from the previous liquid-like diffusive state. The wrinkles first appeared upon droplet retraction as the interface was subjected to a large compression in the latitudinal direction but then disappeared within 4 seconds. As shown in the droplet retraction and relaxation photographs in FIG. 3C, applying another droplet retraction in late stage II resulted in an even slower recovery of interfacial tension, and the lifetime of wrinkles extended to beyond 90 seconds. At this stage, the packing density increased, and the interface layer became more networked and more viscoelastic, accompanied by a gradual loss of fluidity. Stage II was a transition stage during which the interface was developing its solid-like properties. Further increasing the packing density eventually led to the final stage III. The interfacial tension did not recover after the droplet retraction and the wrinkles on the surface persisted. The non-equilibrium shape of the partially retracted droplet was held by the rigidity of interface when the interface became a solid-like film in stage III.

In many previously reported interfacial systems, the recovery of interfacial tension, as well as the fading of wrinkles, would occur when the packing density passed a threshold of glassy interface formation, such that the interface relaxes to an equilibrium state by desorption of surfactant particles (e.g., T. Feng et al., *Soft Matter*, 12, 8701, 2016). In this lignin-based system, however, several pieces of evidence suggested a different mechanism. First, when the packing density was far from the threshold in stage I, the recovery of interfacial tension still appeared. Second, in stage III, a plateau, instead of a recovery, of interfacial tension appeared right after the droplet retraction. This indicated that desorption of lignin particles during the droplet retraction was negligible. Third, the equilibrium interfacial tension after recovery was always lower than the initial interfacial tension before droplet retraction, regardless of the stage (FIG. 3A). This suggested that after each retraction, the packing density always increased.

Further evidence proving the nonexistence of interfacial desorption is the relationship between dynamic interfacial tension and surface area after each droplet retraction. The interfacial tension at a time t would be $\gamma(t)=\gamma_{oil/WATER}-k\Gamma_t A_t$, where $\Gamma_t$ is the packing density, $A_t$ is the interfacial area, and k is a constant denoting the drop in interfacial tension caused by an individual lignin particle. If no desorption occurred during the retraction and recovery, the total mass of lignin at the interface would stay the same, i.e., $\Gamma_0 A_0 = \Gamma_t A_t$, where $\Gamma_0$ and $A_0$ are, respectively, packing density and interfacial area when wrinkles began to form. And the previous equation can be written as $$\gamma(t) = \gamma_{oil/water} - k\Gamma_0 \frac{A_0}{A(t)} \quad (1)$$

Figure 3B:
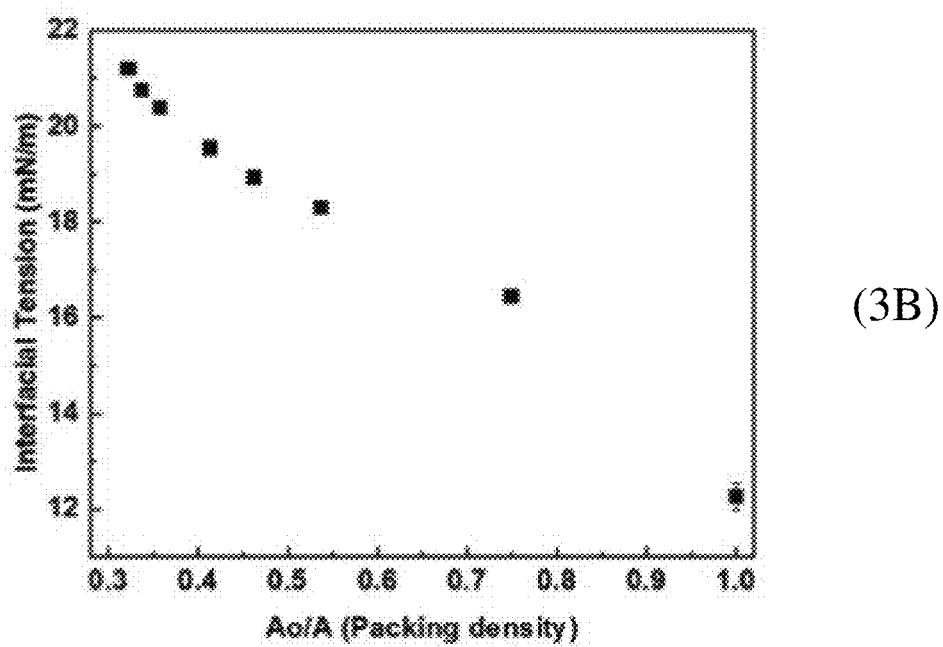
Figure 3C:
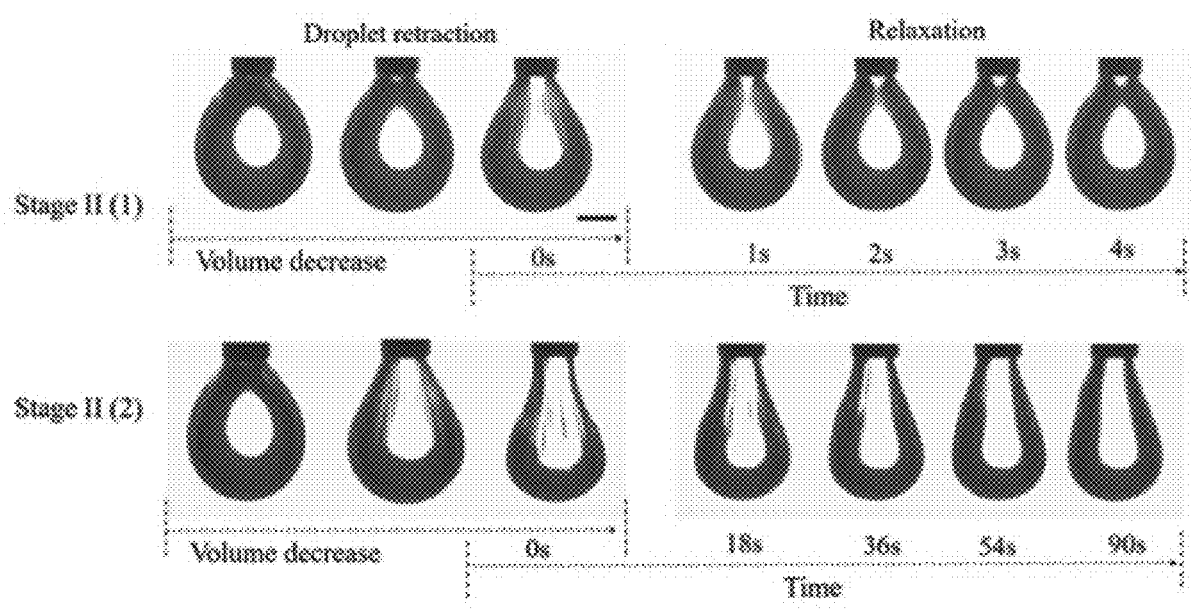

To verify the validity of Equation (1), a droplet was consecutively retracted in stage II. After each retraction, the interfacial tension and the surface area at the new equilibrium/steady state (i.e., when the droplet fully recovered) were measured. The plot of interfacial tension $\gamma(t)$ against $A_0/A_t$ was indeed linear, as shown in FIG. 3B, in accordance with what Equation (1) predicted. Thus, the hypothesis of negligible desorption is valid, and the interfacial tension recovery was not caused by the desorption of particles.

The interfacial tension recovery appears to arise from the reorganization of particles at the interface. When the droplet volume was reduced, the droplet was stretched in the vertical direction and the Laplace pressure at the upper part of the droplet was reduced, leading to the inward collapse of the droplet. Thus, in addition to the stretching in the vertical direction, the upper droplet surface also experienced a compression in the latitudinal direction. This caused a local increase in particle concentration as compared with the lower part of the droplet surface. After volume reduction, the particles reorganized and finally approached a uniform concentration on the droplet surface. At a low packing density (before the jamming formed), the droplet surface was still fluid-like, and the reorganization process was very short because of the Marangoni flow. After the jamming transition, the interface became more solid-like, which prolonged the reorganization process. The recovery lasts for over 2 hours for the interface with a high packing density. If desired, functionalities in the oligomers can be tailored to devise rapid and irreversible jamming via chemical crosslinking between the adjacent molecules. In such cases, however, shape recovery or restructuring may not be possible within any given experimental time.

Reconfigurable Wrapping of a Droplet in Nonequilibrium Morphologies

Figure 4:
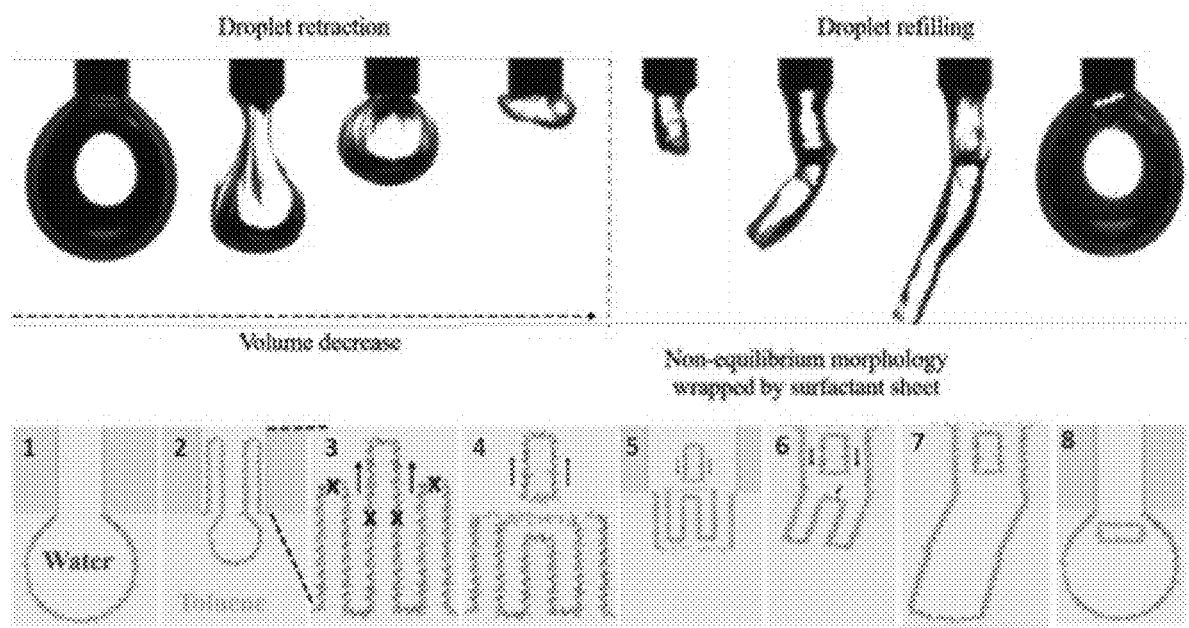
FIG. 4 (top row) shows the creation of a non-equilibrium morphology, i.e., a cylindrical water droplet containing a toluene droplet inside, by suction-and-injection of a droplet wrapped by surfactant sheets.

Not only could the surfactant sheet stably wrap either water or oil droplet in their immiscible liquid, but it was also able to promptly repair itself upon breakage and reconfigure the wrapped geometry. This was exemplified by a suction-and-injection experiment of a wrapped water droplet in toluene. As shown in the image series in FIG. 4, when a part of a water droplet was retracted, some toluene around the retracted water and the surfactant sheet at the interface were also withdrawn into the needle. Inside the constrained space in the needle, the surfactant sheet temporarily reassembled at the new cylindrical interface. Further withdrawing through the syringe created a large shear force and tore apart the once continuous toluene/water interface, as well as the surfactant sheet, into smaller pieces. These small pieces of surfactant sheets then wrapped either water or toluene nearby into nonequilibrium morphologies in the needle. When the same volume of retracted liquid was refilled into a droplet from the needle, two transformed droplets appeared: an irregularly shaped toluene droplet was contained inside of a cylindrical water droplet. Complete refilling of the droplet brought back the spherical shape which, however, contained a toluene phase wrapped by surfactant sheet. These extraordinary shapes were evidence of the quick reassembly and reconfiguration capability of the surfactant sheets.

Here, the wrapping of the irregular-shaped toluene droplet was similar to an observation in a previous study, where for a fixed area, an ultrathin sheet automatically achieved optimally efficient shapes that maximized the enclosed volume of liquid (J. D. Paulsen et al., Nat. Mater., 13, 1206, 2015). However, the surfactant sheets in this report were cross-linked by dynamic hydrogen bonding, which prevented the cleaved surfactant sheets from falling apart, and allowed them to either reconnect with each other or to form new individual wraps at new interfaces. This is how the cylindrical water droplet was formed. Despite the relatively weak strength of hydrogen bonding, the surfactant sheet could resist certain stress and keep the pre-restricted nonequilibrium shape, partially as a result of the high Young's modulus of lignin. The nonequilibrium shape was trapped until further filling. Therefore, when the retracted water was injected back through the needle, the wrapped toluene droplet kept floating at the top of the growing cylindrical water droplet.

Wrapped Porous Microparticles: Morphology Transition Induced by Surfactant Sheet Preparation of Sealed Porous Microparticles: A dichloromethane/water emulsion with 10 mg mL$^{-1}$ of PS$_{38k}$-PEO$_{11k}$ copolymers dispersed in an aqueous phase was selected as a model system to demonstrate the efficacy of the surfactant sheet. The porous microparticles were made from droplets in emulsion. Meanwhile, the continuous phase contained 0.04 mg mL$^{-1}$ lignin nanoparticle surfactant that stabilized the emulsions by reducing the interfacial tension and forming physical steric hindrance against coalescence. The porous microparticles were obtained by solvent evaporation of droplets on a glass coverslip open to air at room temperature. During the evaporation, morphology evolution occurred due to interfacial instability which further came from the low interfacial tension. Depending on the geometry of the container and the quantity of emulsion, the evaporation of solvent would take tens of minutes to hours. The dried droplets were characterized by SEM.

Interfacial instability is a contemporary topic that is extensively studied in polymer science to develop novel morphologies, with one example being hierarchically structured microparticles during solvent removal from oil-in-water emulsions. The fundamental principle is that the interface is full of fluctuations and the undulation amplitude is controlled by the interfacial tension. A reduction in interfacial tension enhances undulation amplitude, and various microstructures can form at the interface transiently when the undulation amplitude is significant enough. The surfactant sheet features strong interfacial activity. Therefore, it not only wraps the liquid droplet, just like the conventional thin elastic sheet does, but also assists in the morphological transition of the droplet interface.

Figures 5A, 5B, 5C, 5D:
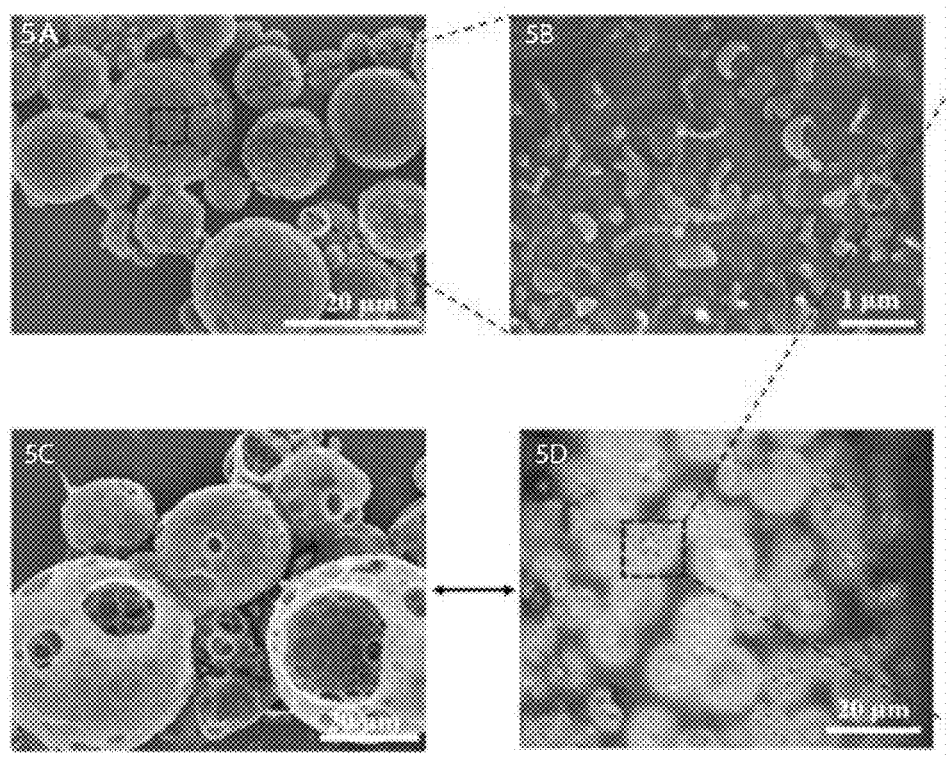
FIG. 5A is a SEM image of $PS_{38k}$-$PEO_{11k}$ microparticles formed by removal of dichloromethane from emulsion droplets.
FIG. 5B is a SEM image of a fused budding vesicle on the surface of microparticles shown in FIG. 5A.
FIG. 5C is a SEM image of a lignin surfactant sheet wrapping $PS_{38k}$-$PEO_{11k}$ porous microparticles.
FIG. 5D is an optical microscopy image in transmission mode showing the porous structure inside the microparticles.
Figure 5E:
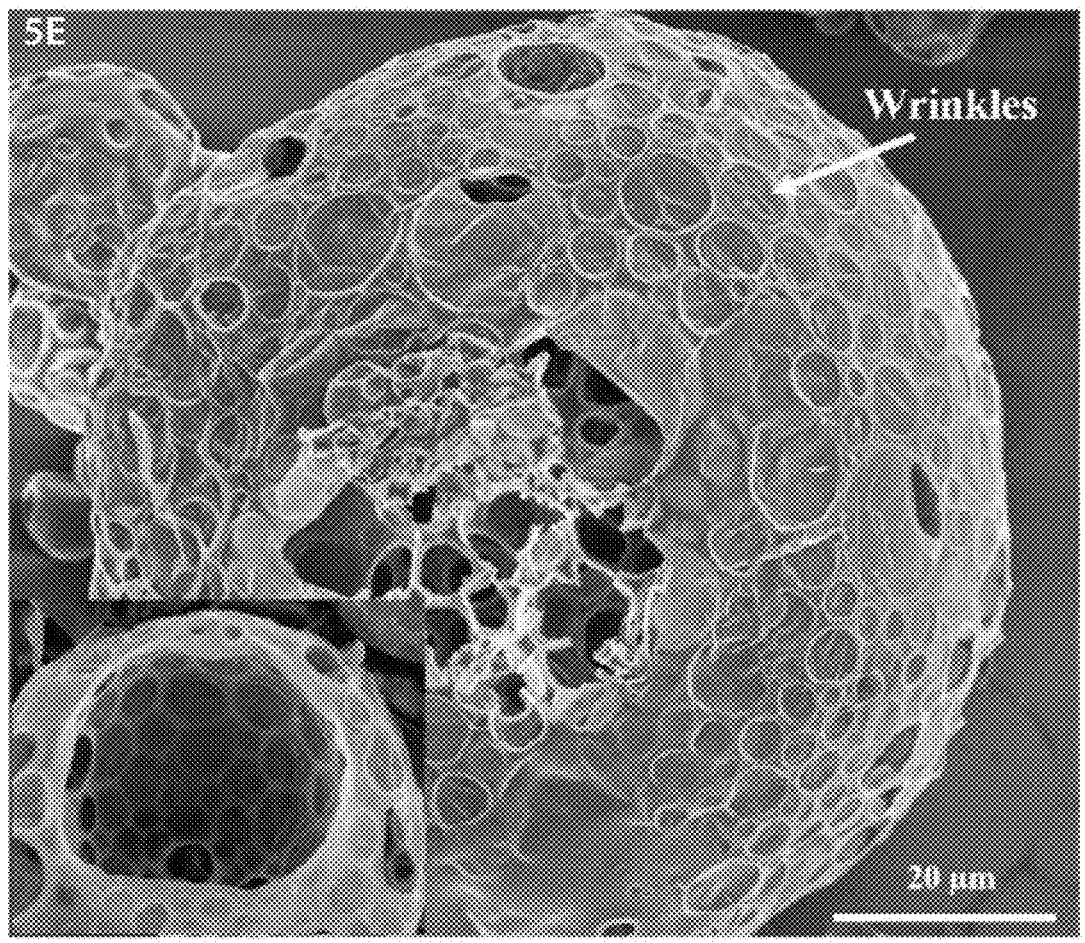
FIG. 5E is an SEM image of partly peeled-off microparticles showing that some pores inside of microparticles are also covered by the surfactant sheet. It also shows there is some buckling of the thin sheet.

FIG. 5A is a SEM image of PS$_{38k}$-PEO$_{11k}$ microparticles formed by removal of dichloromethane from emulsion droplets. FIG. 5B is a SEM image of a fused budding vesicle on the surface of microparticles shown in FIG. 5A. In the native system without the lignin particles, budded and fused vesicles were formed on the surface of microparticles after solvent removal (FIGS. 5A,5B), which resulted from the surface undulation. However, as shown in FIGS. 5C-5E, when lignin particles were present in the aqueous phase, a porous structure sealed under a membrane would form after solvent was removed. FIG. 5C is a SEM image of a lignin surfactant sheet wrapping PS$_{38k}$-PEO$_{11k}$ porous microparticles. FIG. 5D is an optical microscopy images in transmission mode showing the porous structure inside the microparticles. FIG. 5E is an SEM image of partly peeled-off microparticles showing that some pores inside of microparticles are also covered by the surfactant sheet. It also shows there is some buckling of the thin sheet.

Figure 5F:
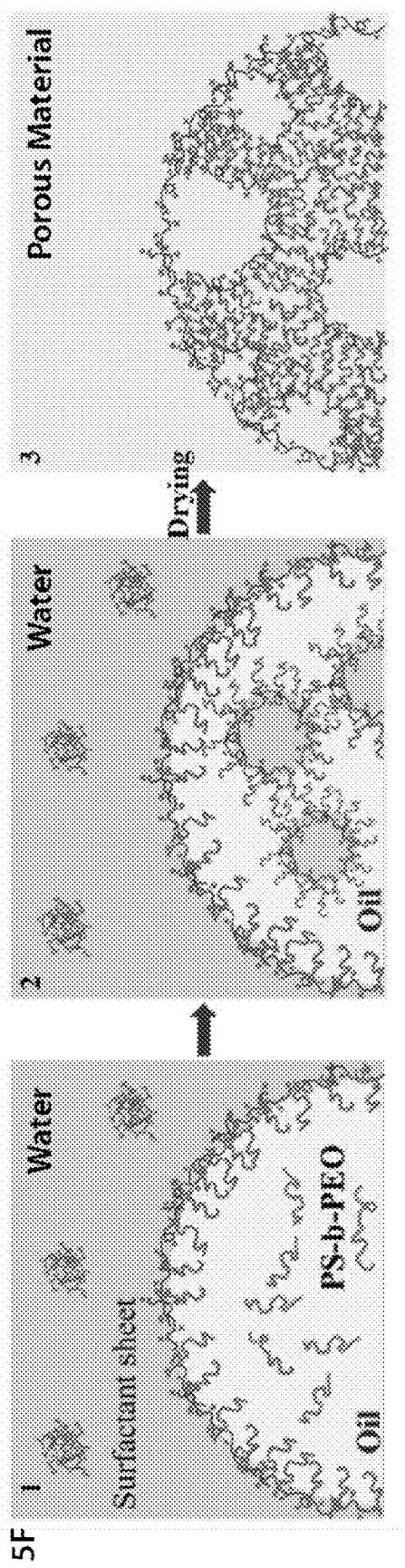
FIG. 5F is a schematic illustration of the formation of the hierarchically wrapped porous microparticles.

The significant morphology difference of the structure (i.e., with and without lignin particles) was a result of the different levels of interfacial tension reduction, depending on the species and behaviors of the surfactant at the interface. When only amphiphilic block copolymers were in the system (FIG. 5A), the interfacial tension was decreased, but not to a low enough value for a spontaneous emulsification. The weak undulation of the interface only resulted in some fine structures on the surface of dried droplet. On the other hand, when both the copolymer and the lignin particles adsorbed at the interface, the interfacial tension was decreased enough to achieve spontaneous emulsification. Moreover, as the lignin surfactant sheet expanded at the interface and gradually formed a jammed state, the interfacial tension was further reduced and the interface was destabilized as well, both of which drove the morphology transition. During the spontaneous emulsification, many water droplets were formed inside the preliminary oil droplet, forming a system of water/oil/water double emulsions. Thus, a hierarchically porous structure appeared after the solvent was evaporated. The formation mechanism of such sealed porous structure is explained in FIG. 5F. FIG. 5F is a schematic illustration of the formation of the hierarchically wrapped porous microparticles. The surfactant sheet and $PS_{38k}$-$PEO_{11k}$ self-assemble at the interface and synergistically reduce the interfacial tension, further inducing interfacial instability.

Interestingly, this hierarchically sealed porous morphology was also a result of the solid-like thin sheet at the interface. While the interfacial jamming strengthened the interface instability, the interface was also becoming more and more solid-like during the morphology transition. Were the surfactants mobile at the interface, open-porous structures would have appeared after solvent removal (K. H. Hu et al., *ACS Nano*, 10, 5243, 2016). The capability of in situ trapping the morphology evolution is one of the novelties of this lignin system.

The surfactant sheet not only allowed the solvent to permeate and evaporate, but also remained stable during this process due to its solid-like property, essentially working as a membrane. Underneath the exterior membrane that wrapped around a microparticle, the pores inside the microparticle were also similarly covered by a membrane, indicating a hierarchical structure. Additionally, buckled small-scale structures were also found on the microparticle surface during the shrinking. The existence of membranes inside the microparticles and the buckling on the surface proved that a solid-like sheet was preformed at the interface before the solvent removal. Thus, aided by the surfactant sheet, a new morphology of hierarchically wrapped porous microparticles was created by interfacial roughening.

While there have been shown and described what are at present considered the preferred embodiments of the invention, those skilled in the art may make various changes and modifications which remain within the scope of the invention defined by the appended claims.

What is claimed is:

1. A lignin dispersion composition comprising spherical lignin particles dispersed in an aqueous medium, wherein the spherical lignin particles have a substantially uniform size characterized by a median particle size of 500 nm and a maximum deviation from said median particle size of ±50 nm.

2. The composition of claim 1, wherein the composition does not contain a surfactant.

3. The composition of claim 1, wherein the aqueous medium is at least 95 vol % water.

4. The composition of claim 1, wherein the aqueous medium contains a water- miscible organic solvent in an amount of up to 1 vol %.

5. A method of producing a lignin dispersion, the method comprising:
   (i) dissolving lignin in an organic solvent substantially devoid of water yet miscible with water to result in a solution of the lignin in the organic solvent; and
   (ii) producing the lignin dispersion by dialyzing said solution of the lignin with water until substantially all of the organic solvent is replaced with water with simultaneous formation of spherical lignin particles dispersed in the water, wherein the spherical lignin particles have a substantially uniform size characterized by a median particle size of 500 nm and a maximum deviation from said median particle size of ±50 nm.

6. The method of claim 5, wherein the organic solvent comprises a ketone, alcohol, or nitrile.

7. The method of claim 5, wherein the organic solvent comprises acetone or acetonitrile.

8. The method of claim 5, wherein the spherical lignin particles have a size exclusively within a range of 200 nm to 2 microns.

9. The method of claim 5, further comprising: (iii) centrifuging the lignin dispersion produced in step (ii) to separate flocculated matter from the lignin dispersion, and (iv) retrieving the supernatant in which the lignin dispersion is present.

10. A method for stabilizing an emulsion containing at least two immiscible liquids, the method comprising intimately mixing the emulsion with a lignin dispersion composition comprising spherical lignin particles dispersed in an aqueous medium, wherein the spherical lignin particles have a substantially uniform size characterized by a median particle size of 500 nm and a maximum deviation from said median particle size of ±50 nm.

11. The method of claim 10, wherein the at least two immiscible liquids comprise an oil, hydrocarbon, or halohydrocarbon liquid droplets suspended in a liquid aqueous or alcohol matrix.

12. The method of claim 10, wherein the spherical lignin particles have a size exclusively within a range of 200 nm to 2 microns.

13. The method of claim 10, wherein the spherical lignin particles unravel to form a sheet of 5-20 nm thickness at the liquid-liquid interface of the at least two immiscible liquids.

14. A method for producing a hierarchical assembly of porous microparticles, the method comprising:
   (i) intimately mixing an emulsion containing at least two immiscible liquids with an amphiphilic block copolymer and a lignin dispersion composition comprising spherical lignin particles having a substantially uniform size characterized by a median particle size of 500 nm and a maximum deviation from said median particle size of ±50 nm dispersed in an aqueous medium, to result in formation of a lignin sheet of 5-20 nm thickness at liquid-liquid interfaces between the at least two immiscible liquids, and forming a double emulsion containing the at least two immiscible liquids;
   (ii) spreading the double emulsion onto a surface to produce a film of the double emulsion; and
   (iii) evaporating the immiscible liquids from the film to produce a solid film of the hierarchical assembly of porous microparticles.

15. The method of claim 14, wherein the amphiphilic block copolymer comprises at least one hydrophilic polyalkylene oxide block and at least one lipophilic polyvinylhydrocarbon block.

16. The method of claim 14, wherein the spherical lignin particles have a size exclusively within a range of 200 nm to 2 microns.

17. The method of claim 14, wherein the hierarchical assembly of porous microparticles is crosslinked with a crosslinker to render the hierarchical assembly rigid.

18. The method of claim 17, wherein the crosslinker is boric acid or formaldehyde.

\* \* \* \* \*